US009119488B2

(12) United States Patent
Lockwood et al.

(10) Patent No.: US 9,119,488 B2
(45) Date of Patent: Sep. 1, 2015

(54) SECURE MERCHANDISING DISPLAY WITH BLOCKER MECHANISMS

(75) Inventors: Thomas A. Lockwood, Clemmons, NC (US); Roger K. Miller, East Bend, NC (US)

(73) Assignee: Rock-Tenn Shared Services, LLC, Norcross, GA (US)

( * ) Notice: Subject to any disclaimer, the term of this patent is extended or adjusted under 35 U.S.C. 154(b) by 522 days.

(21) Appl. No.: 13/111,235

(22) Filed: May 19, 2011

(65) Prior Publication Data

US 2011/0315706 A1 Dec. 29, 2011

Related U.S. Application Data

(63) Continuation-in-part of application No. 12/792,252, filed on Jun. 2, 2010, which is a continuation-in-part of application No. 12/567,370, filed on Sep. 25, 2009.

(60) Provisional application No. 61/346,211, filed on May 19, 2010.

(51) Int. Cl.

| | |
|---|---|
| ***B65G 59/00*** | (2006.01) |
| ***B65D 83/00*** | (2006.01) |
| ***A47F 1/12*** | (2006.01) |
| ***A47F 3/00*** | (2006.01) |
| ***G07F 9/02*** | (2006.01) |
| ***G07F 11/00*** | (2006.01) |

(Continued)

(52) U.S. Cl.
CPC ................. *A47F 1/126* (2013.01); *A47F 3/002* (2013.01); *G07F 9/026* (2013.01); *G07F 11/002* (2013.01); *G07F 11/42* (2013.01); *G07G 3/003* (2013.01)

(58) Field of Classification Search
USPC ......... 221/208, 224, 226–230, 232, 247–249, 221/256, 257, 263, 265, 271, 276, 279
See application file for complete search history.

(56) References Cited

U.S. PATENT DOCUMENTS

| | | | |
|---|---|---|---|
| 691,990 | A | 1/1902 | Warren |
| 1,034,318 | A | 7/1912 | Sobretto et al. |
| 1,123,071 | A | 12/1914 | Bell |

(Continued)

FOREIGN PATENT DOCUMENTS

| | | |
|---|---|---|
| DE | 202005010088 | 10/2005 |
| DE | 202005019621 | 3/2006 |

(Continued)

OTHER PUBLICATIONS

International Preliminary Report on Patentability dated Dec. 15, 2011 in Application No. PCT/US2010/037026.

(Continued)

*Primary Examiner* — Gene Crawford
*Assistant Examiner* — Kelvin L Randall, Jr.
(74) *Attorney, Agent, or Firm* — Kilpatrick Townsend & Stockton LLP; Robert A. Currie

(57) ABSTRACT

A system for controlling advancement of and access to product housed within a device. Systems and devices include a pushing assembly having a track, a pusher, and a stop for restricting forward movement of the pusher when the stop is engaged. The device also includes a door assembly that has an open position and a closed position, an engaging mechanism that engages the stop when the door assembly is in the open position, and a blocker mechanism that restricts consumer access to product located behind the door assembly.

5 Claims, 23 Drawing Sheets

(51) Int. Cl.
*G07F 11/42* (2006.01)
*G07G 3/00* (2006.01)

(56) References Cited

U.S. PATENT DOCUMENTS

| | | | | |
|---|---|---|---|---|
| 1,319,084 | A | 10/1919 | Hume | |
| 1,446,010 | A * | 2/1923 | Holland | 221/98 |
| 1,533,147 | A | 4/1925 | Svendsgaard | |
| 1,592,720 | A | 7/1926 | Butler | |
| 1,614,363 | A | 1/1927 | Hicks | |
| 1,680,275 | A | 8/1928 | Albaugh | |
| 1,755,655 | A | 4/1930 | Langenfeld | |
| 1,813,935 | A | 7/1931 | Knee | |
| 1,841,926 | A | 1/1932 | Wray | |
| 1,913,843 | A | 6/1933 | Marcuse | |
| 2,142,053 | A | 12/1938 | Hoban | |
| 2,163,280 | A | 6/1939 | Hibshman | |
| 2,304,533 | A | 12/1942 | Bright | |
| 2,317,145 | A * | 4/1943 | Hagstrom et al. | 312/36 |
| 2,412,368 | A | 2/1945 | Tascher | |
| 2,423,265 | A * | 7/1947 | Stewart | 221/130 |
| 2,824,666 | A | 2/1958 | Hausladen | |
| 2,977,023 | A | 3/1961 | Meyer | |
| 3,161,295 | A | 12/1964 | Chesley | |
| 3,199,724 | A | 8/1965 | Domenico et al. | |
| 3,313,448 | A | 4/1967 | Suttle et al. | |
| 3,351,233 | A | 11/1967 | Chanoch et al. | |
| 3,452,899 | A | 7/1969 | Libberton | |
| 3,578,207 | A | 5/1971 | Danow | |
| 3,583,568 | A | 6/1971 | Crossien | |
| 3,591,048 | A | 7/1971 | Myers et al. | |
| 3,749,279 | A | 7/1973 | Ungerman | |
| 3,752,357 | A | 8/1973 | Harris | |
| 3,773,461 | A * | 11/1973 | Arimoto et al. | 432/185 |
| 3,776,418 | A | 12/1973 | Bookout | |
| 3,777,931 | A * | 12/1973 | Fleming | 221/57 |
| 3,796,345 | A | 3/1974 | Fessler | |
| 3,805,962 | A | 4/1974 | Bendiksen | |
| 3,885,706 | A | 5/1975 | Lodge | |
| 3,923,159 | A | 12/1975 | Taylor et al. | |
| 3,957,173 | A | 5/1976 | Roudebush | |
| 3,968,900 | A | 7/1976 | Stambuk | |
| 3,999,662 | A | 12/1976 | Barnhardt | |
| 4,007,853 | A | 2/1977 | Bahneman | |
| 4,010,869 | A | 3/1977 | Adamo | |
| 4,018,100 | A | 4/1977 | Moe | |
| 4,190,179 | A | 2/1980 | Moss et al. | |
| 4,228,903 | A | 10/1980 | Eckert | |
| 4,275,819 | A | 6/1981 | Perez | |
| 4,308,974 | A | 1/1982 | Jones | |
| 4,336,892 | A | 6/1982 | Cox et al. | |
| 4,369,887 | A | 1/1983 | Emery | |
| 4,371,093 | A | 2/1983 | Berger | |
| 4,412,607 | A | 11/1983 | Collins et al. | |
| 4,474,300 | A | 10/1984 | Entis | |
| 4,506,607 | A | 3/1985 | Jacoby | |
| 4,576,272 | A | 3/1986 | Morgan et al. | |
| 4,679,684 | A | 7/1987 | Glaser | |
| 4,682,826 | A | 7/1987 | Mestdagh | |
| 4,779,760 | A | 10/1988 | Wittern et al. | |
| 4,852,767 | A | 8/1989 | Humphrey | |
| 4,887,737 | A | 12/1989 | Adenau | |
| 4,954,760 | A | 9/1990 | Futch et al. | |
| 4,962,867 | A | 10/1990 | Ficken et al. | |
| 4,965,551 | A | 10/1990 | Box | |
| 5,012,936 | A | 5/1991 | Crum | |
| 5,046,641 | A | 9/1991 | Gray | |
| 5,067,634 | A | 11/1991 | Vidondo | |
| 5,096,367 | A | 3/1992 | Winski | |
| 5,097,611 | A | 3/1992 | Smollar et al. | |
| 5,111,942 | A | 5/1992 | Bernardin | |
| 5,121,854 | A | 6/1992 | Trouteaud et al. | |
| 5,150,101 | A | 9/1992 | Goris et al. | |
| 5,169,027 | A | 12/1992 | Falk et al. | |
| 5,178,298 | A | 1/1993 | Allina | |
| 5,199,598 | A | 4/1993 | Sampson | |
| 5,229,749 | A | 7/1993 | Yenglin | |
| 5,232,102 | A | 8/1993 | Ozawa | |
| 5,240,126 | A | 8/1993 | Foster et al. | |
| 5,248,060 | A | 9/1993 | Friedman et al. | |
| 5,249,705 | A | 10/1993 | Gates | |
| 5,252,948 | A | 10/1993 | Goris et al. | |
| 5,253,782 | A | 10/1993 | Gates et al. | |
| 5,263,596 | A | 11/1993 | Williams | |
| 5,269,597 | A | 12/1993 | Yenglin et al. | |
| 5,285,926 | A | 2/1994 | Falk et al. | |
| 5,335,816 | A | 8/1994 | Kaufman et al. | |
| 5,335,818 | A | 8/1994 | Maldanis | |
| 5,360,134 | A | 11/1994 | Falk | |
| 5,375,735 | A | 12/1994 | Huvey et al. | |
| 5,375,737 | A | 12/1994 | Ficken | |
| 5,385,266 | A | 1/1995 | Pate | |
| 5,397,025 | A | 3/1995 | Lee | |
| 5,400,919 | A | 3/1995 | Gomm et al. | |
| 5,439,136 | A | 8/1995 | Chatani et al. | |
| 5,450,969 | A | 9/1995 | Johnson et al. | |
| 5,460,294 | A | 10/1995 | Williams | |
| 5,462,198 | A | 10/1995 | Schwimmer | |
| 5,542,552 | A | 8/1996 | Yablans et al. | |
| 5,632,408 | A | 5/1997 | Mitchell | |
| 5,665,304 | A | 9/1997 | Heinen et al. | |
| 5,709,315 | A | 1/1998 | Kahler et al. | |
| 5,716,114 | A | 2/1998 | Holmes et al. | |
| 5,790,409 | A | 8/1998 | Fedor et al. | |
| 5,813,568 | A | 9/1998 | Lowing | |
| 5,855,281 | A | 1/1999 | Rabas | |
| 5,909,932 | A | 6/1999 | Shih | |
| 5,927,540 | A | 7/1999 | Godlewski | |
| 5,960,984 | A | 10/1999 | Weston | |
| 5,960,988 | A | 10/1999 | Freixas | |
| 6,084,511 | A | 7/2000 | Kil | |
| 6,105,791 | A | 8/2000 | Chalson et al. | |
| 6,131,748 | A | 10/2000 | Kawasaki et al. | |
| 6,176,558 | B1 | 1/2001 | Hilade et al. | |
| 6,189,727 | B1 | 2/2001 | Shoenfeld | |
| 6,196,416 | B1 | 3/2001 | Seagle | |
| 6,199,720 | B1 | 3/2001 | Rudick et al. | |
| 6,206,237 | B1 | 3/2001 | Dillon et al. | |
| 6,230,932 | B1 | 5/2001 | Lowing et al. | |
| 6,241,121 | B1 | 6/2001 | Yasaka | |
| 6,263,259 | B1 | 7/2001 | Bartur | |
| 6,301,501 | B1 | 10/2001 | Cronin et al. | |
| 6,318,591 | B1 | 11/2001 | Martin | |
| 6,325,242 | B1 | 12/2001 | Izawa et al. | |
| 6,415,953 | B1 * | 7/2002 | O'Brien et al. | 221/196 |
| 6,454,107 | B1 | 9/2002 | Belanger et al. | |
| 6,464,089 | B1 | 10/2002 | Rankin | |
| 6,474,478 | B1 | 11/2002 | Huchner et al. | |
| 6,478,187 | B2 | 11/2002 | Simson et al. | |
| 6,520,604 | B1 | 2/2003 | Yasaka et al. | |
| 6,581,798 | B2 | 6/2003 | Liff et al. | |
| 6,601,416 | B1 | 8/2003 | Sanders | |
| 6,604,652 | B1 | 8/2003 | Trautwein | |
| 6,622,979 | B2 | 9/2003 | Valiulis | |
| 6,659,291 | B2 | 12/2003 | Huchner et al. | |
| 6,684,126 | B2 | 1/2004 | Omura et al. | |
| 6,691,891 | B2 | 2/2004 | Maldonado | |
| 6,694,221 | B2 | 2/2004 | Chavez et al. | |
| 6,735,473 | B2 | 5/2004 | Kolder et al. | |
| D491,403 | S | 6/2004 | Gervasi | |
| 6,758,370 | B2 | 7/2004 | Cooke et al. | |
| 6,776,304 | B2 | 8/2004 | Liff et al. | |
| 6,786,341 | B2 | 9/2004 | Stinnett et al. | |
| 6,814,254 | B2 | 11/2004 | Liff et al. | |
| 6,814,255 | B2 | 11/2004 | Liff et al. | |
| 6,857,539 | B2 | 2/2005 | Parra | |
| 6,892,898 | B1 | 5/2005 | Boone et al. | |
| 6,957,555 | B1 | 10/2005 | Nagel et al. | |
| 7,007,810 | B2 | 3/2006 | Huehner et al. | |
| 7,017,778 | B2 | 3/2006 | Halbherr | |
| 7,024,894 | B2 | 4/2006 | Salonen | |
| 7,032,776 | B2 | 4/2006 | Hieb | |
| D521,363 | S | 5/2006 | Copen et al. | |
| 7,052,097 | B2 | 5/2006 | Meek et al. | |

(56) References Cited

U.S. PATENT DOCUMENTS

| | | | | |
|---|---|---|---|---|
| 7,086,541 | B2 | 8/2006 | Robertson | |
| 7,128,221 | B2 | 10/2006 | Metcalf | |
| 7,128,239 | B2 | 10/2006 | Skavnak | |
| 7,131,542 | B2 | 11/2006 | Sedon et al. | |
| 7,149,600 | B2 | 12/2006 | Rippolone | |
| 7,150,365 | B2 | 12/2006 | Hardy et al. | |
| 7,151,982 | B2 | 12/2006 | Liff et al. | |
| 7,152,536 | B2 | 12/2006 | Hardy | |
| 7,175,045 | B2 | 2/2007 | Bond | |
| 7,178,678 | B2 | 2/2007 | Mansfield et al. | |
| 7,197,902 | B1 | 4/2007 | Barkdoll | |
| 7,207,447 | B2 | 4/2007 | Medcalf et al. | |
| 7,213,722 | B2 | 5/2007 | Nagelski et al. | |
| 7,246,711 | B1 | 7/2007 | Metcalf | |
| 7,249,761 | B2 | 7/2007 | Graef et al. | |
| 7,264,138 | B2 | 9/2007 | Collins et al. | |
| 7,269,983 | B1 | 9/2007 | Mchatet | |
| 7,293,672 | B2 | 11/2007 | Mori | |
| 7,299,934 | B2 | 11/2007 | Hardy et al. | |
| 7,303,095 | B2 | 12/2007 | Nagelski | |
| 7,347,335 | B2 | 3/2008 | Rankin, VI et al. | |
| 7,348,884 | B2 | 3/2008 | Higham | |
| 7,389,886 | B2 | 6/2008 | Hardy et al. | |
| 7,451,881 | B2 | 11/2008 | Hardy et al. | |
| 7,458,473 | B1 | 12/2008 | Mason | |
| 7,469,791 | B2 | 12/2008 | Phoy | |
| 7,497,341 | B2 | 3/2009 | Hardy et al. | |
| 7,533,784 | B2 | 5/2009 | Vlastakis et al. | |
| 7,564,351 | B2 | 7/2009 | Nagelski et al. | |
| 7,604,145 | B2 * | 10/2009 | Percy | 221/95 |
| 7,621,409 | B2 | 11/2009 | Hardy et al. | |
| 7,641,072 | B1 | 1/2010 | Vlastakis et al. | |
| 7,661,545 | B2 | 2/2010 | Hardy et al. | |
| 7,669,722 | B2 | 3/2010 | Hardy et al. | |
| 7,675,421 | B2 | 3/2010 | Higham | |
| 7,768,399 | B2 | 8/2010 | Hachmann et al. | |
| 7,784,644 | B2 * | 8/2010 | Albert et al. | 221/274 |
| 7,823,734 | B2 | 11/2010 | Hardy | |
| 7,828,158 | B2 | 11/2010 | Colelli et al. | |
| 7,837,058 | B2 * | 11/2010 | Collins et al. | 221/123 |
| 8,013,740 | B2 | 9/2011 | Irmscher et al. | |
| 8,038,016 | B2 * | 10/2011 | Yuyama et al. | 211/59.3 |
| 8,047,385 | B2 | 11/2011 | Hardy | |
| 8,056,734 | B2 | 11/2011 | Menz et al. | |
| 8,056,740 | B2 | 11/2011 | Weshler et al. | |
| 8,087,541 | B2 * | 1/2012 | Valota et al. | 221/301 |
| 8,090,473 | B2 | 1/2012 | Higham | |
| 8,146,471 | B2 | 4/2012 | Hansen et al. | |
| 8,146,753 | B2 | 4/2012 | Yuyama | |
| 8,190,289 | B2 | 5/2012 | Lockwood | |
| 8,215,520 | B2 | 7/2012 | Miller et al. | |
| 8,235,227 | B2 | 8/2012 | Hardy | |
| 8,353,425 | B2 | 1/2013 | Lockwood et al. | |
| 8,386,075 | B2 | 2/2013 | Lockwood | |
| 2003/0029816 | A1 | 2/2003 | Huchner et al. | |
| 2003/0121929 | A1 | 7/2003 | Liff et al. | |
| 2003/0178435 | A1 | 9/2003 | Yamaguchi | |
| 2003/0189058 | A1 | 10/2003 | Liff et al. | |
| 2004/0026344 | A1 | 2/2004 | Sedon et al. | |
| 2004/0059464 | A1 | 3/2004 | Veenstra et al. | |
| 2004/0060944 | A1 | 4/2004 | Gervasi | |
| 2004/0084386 | A1 | 5/2004 | Huchner et al. | |
| 2004/0104239 | A1 | 6/2004 | Black et al. | |
| 2004/0149768 | A1 | 8/2004 | Scoville et al. | |
| 2004/0238557 | A1 | 12/2004 | Chirnomas | |
| 2005/0029205 | A1 | 2/2005 | Mansfield et al. | |
| 2005/0029283 | A1 | 2/2005 | Pedigo | |
| 2005/0065645 | A1 | 3/2005 | Liff et al. | |
| 2005/0189369 | A1 | 9/2005 | Vlastakis | |
| 2005/0189370 | A1 | 9/2005 | Carter et al. | |
| 2005/0199644 | A1 | 9/2005 | Barili et al. | |
| 2005/0205596 | A1 | 9/2005 | Kelly | |
| 2005/0252925 | A1 | 11/2005 | Kelly | |
| 2006/0138915 | A1 | 6/2006 | Goldberg | |
| 2006/0157431 | A1 | 7/2006 | Nagelski et al. | |
| 2006/0163272 | A1 | 7/2006 | Gamble | |
| 2006/0219730 | A1 | 10/2006 | Handfield et al. | |
| 2006/0237381 | A1 | 10/2006 | Lockwood et al. | |
| 2006/0266762 | A1 | 11/2006 | Andrews et al. | |
| 2007/0029340 | A1 | 2/2007 | Nagelski et al. | |
| 2007/0078561 | A1 | 4/2007 | Sansone | |
| 2007/0080175 | A1 | 4/2007 | Peterson | |
| 2007/0119796 | A1 | 5/2007 | Barkdoll | |
| 2007/0199863 | A1 | 8/2007 | Knoettqen | |
| 2007/0221679 | A1 | 9/2007 | Chandler et al. | |
| 2007/0251900 | A1 * | 11/2007 | Hardy | 211/59.3 |
| 2007/0273513 | A1 | 11/2007 | White | |
| 2007/0278164 | A1 | 12/2007 | Lang et al. | |
| 2007/0283615 | A1 | 12/2007 | Vlastakis | |
| 2008/0092394 | A1 | 4/2008 | Freitag et al. | |
| 2008/0142538 | A1 | 6/2008 | Miller | |
| 2008/0246375 | A1 | 10/2008 | Berq | |
| 2008/0283477 | A1 | 11/2008 | Wamsley et al. | |
| 2009/0084745 | A1 | 4/2009 | Goehring | |
| 2009/0166304 | A1 | 7/2009 | Hardy et al. | |
| 2009/0184069 | A1 | 7/2009 | Hardy | |
| 2009/0184129 | A1 | 7/2009 | Vlastakis et al. | |
| 2009/0184130 | A1 | 7/2009 | Miller et al. | |
| 2009/0242582 | A1 | 10/2009 | Vlastakis et al. | |
| 2009/0321373 | A1 | 12/2009 | Hardy | |
| 2010/0017025 | A1 | 1/2010 | Lockwood | |
| 2010/0079240 | A1 | 4/2010 | Higham | |
| 2010/0147783 | A1 | 6/2010 | Hardy | |
| 2010/0188221 | A1 | 7/2010 | Irmscher et al. | |
| 2010/0237093 | A1 | 9/2010 | Lockwood | |
| 2011/0017763 | A1 | 1/2011 | Colelli et al. | |
| 2011/0042331 | A1 | 2/2011 | Johnson et al. | |
| 2011/0042332 | A1 | 2/2011 | Hardy | |
| 2011/0094975 | A1 | 4/2011 | Hardy | |
| 2011/0210084 | A1 | 9/2011 | Hardy | |
| 2011/0220597 | A1 | 9/2011 | Sherretts et al. | |
| 2011/0240569 | A1 | 10/2011 | Kahl et al. | |
| 2011/0284488 | A1 | 11/2011 | Hardy | |
| 2011/0284571 | A1 | 11/2011 | Lockwood et al. | |
| 2012/0000869 | A1 | 1/2012 | Hardy | |
| 2012/0285979 | A1 | 11/2012 | Lockwood | |

FOREIGN PATENT DOCUMENTS

| | | | |
|---|---|---|---|
| DE | 202007011927 | | 12/2007 |
| EP | 1541064 | | 6/2005 |
| EP | 1579789 | | 9/2005 |
| JP | 1144185 | | 6/1989 |
| JP | 2219194 | | 8/1990 |
| JP | 9319937 | | 12/1997 |
| JP | 09319937 | | 12/1997 |
| JP | 2005049965 | | 1/2005 |
| JP | 2006285930 | | 10/2006 |
| WO | 8912873 | | 12/1989 |
| WO | 2004028311 | | 4/2004 |
| WO | 2007054042 | | 5/2007 |
| WO | 2006085211 | | 8/2007 |
| WO | 2010094778 | | 8/2010 |
| WO | 2010141552 | A2 | 12/2010 |
| WO | 2010141552 | | 1/2011 |

OTHER PUBLICATIONS

Annex to Form PCTIISAI206—Communication Relating to the Results of the Partial International Search dated Aug. 20, 2010 in related Application No. PCT/US2010/037026.

International Search Report and Written Opinion mailed No. 26, 2010 in Application No. PCT/US2010/037026.

Notice of Allowance dated Oct. 9, 2013 in U.S. Appl. No. 13/015,793.

* cited by examiner

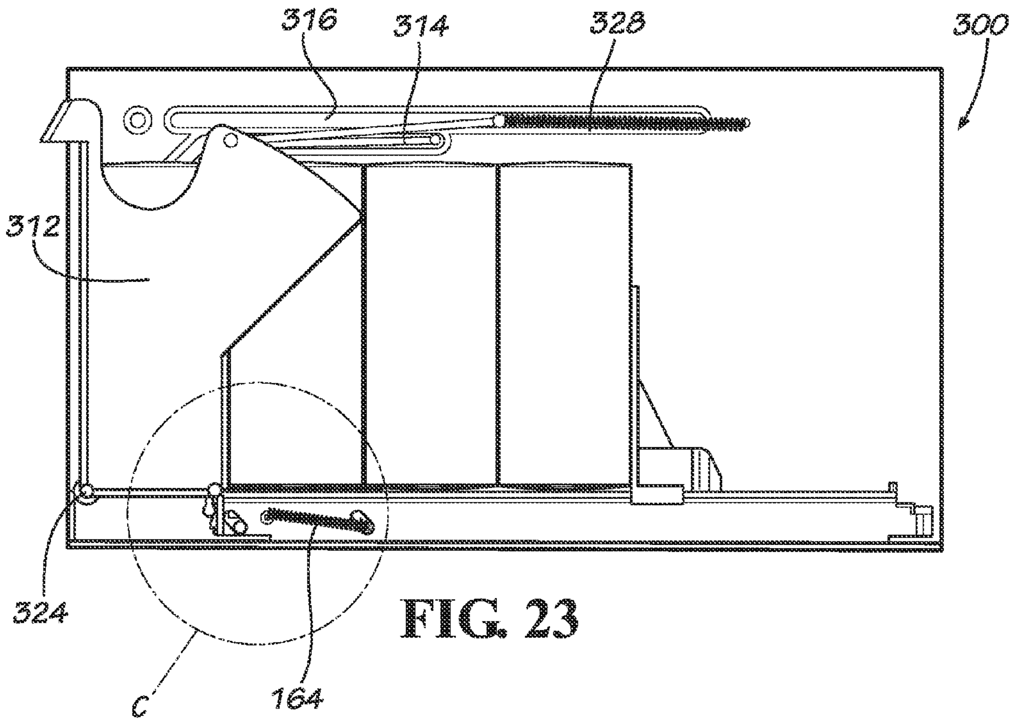
FIG. 23
FIG. 24
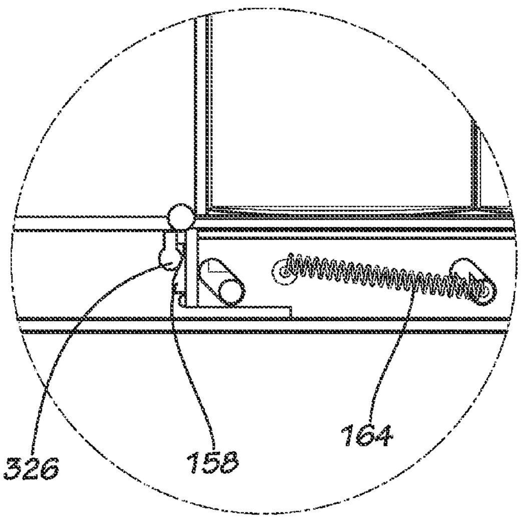

SECURE MERCHANDISING DISPLAY WITH BLOCKER MECHANISMS

RELATED APPLICATION DATA

This application claims the benefit of U.S. Provisional Application No. 61/346,211, filed on May 19, 2010 and titled "SECURE MERCHANDISING DISPLAYS WITH BLOCKER MECHANISMS," and is a continuation-in-part application of U.S. Ser. No. 12/792,252 filed on Jun. 2, 2010 and titled "TIME DELAY PRODUCT PUSHING SYSTEM" and is a continuation-in-part application of U.S. Ser. No. 12/567,370 filed on Sep. 25, 2009 and titled "DISPENSING AND DISPLAY SYSTEM," the entire contents of all of which are hereby incorporated by reference.

FIELD OF THE INVENTION

Embodiments generally relate to systems for advancing and controlling access to product on a shelf.

BACKGROUND

Theft of small items in retail stores is a common problem. Items that are in high demand by thieves include over-the-counter (OTC) products such as analgesics and cough and cold medications, razor blades, camera film, batteries, videos, DVDs, smoking cessation products and infant formula. Shelf sweeping is a particular problem for small items. Shelf sweeping occurs when individuals or groups remove all the shelf stock and exit the store, similar to a "smash and grab" shoplifting technique. Shelf sweeping relies on excessive quantities of product being available on the shelf. Retailers must keep substantial inventory on shelf or incur the cost, including labor costs, of constantly restocking.

In addition to preventing theft, retail stores may want to limit the purchase of certain items. For example, to make methamphetamine, large quantities of cold medication are needed. Pseudoephedrine, the sole active ingredient in many cold medicines and decongestants, is also a key ingredient in methamphetamine, a powerful and highly addictive stimulant.

Retailers are challenged to balance the needs of legitimate consumers' access to high theft items with measures to minimize the incidence of theft. Because theft has become so rampant in certain product categories, such as razors and infant formula, many retail stores are taking the products off the shelves and placing them behind the counter or under lock and key. Customers must request the products to make a purchase. This requires additional labor costs to provide individual service to customers who would normally not require it. It also makes it difficult for customers to compare products. Furthermore, it might not be feasible where the space behind the counter is limited and is needed for prescription medications. In some cases, products are simply unavailable due to high pilferage rates. Therefore, a device or dispensing apparatus that minimizes the incidence of product theft is needed.

SUMMARY

The terms "invention," "the invention," "this invention" and "the present invention" used in this patent are intended to refer broadly to all of the subject matter of this patent and the patent claims below. Statements containing these terms should not be understood to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to the entire specification of this patent, all drawings and each claim.

Systems of this invention relate to controlled access devices that house product and that have a door assembly having an open position and a closed position. When the door assembly is in the open position, a consumer has access to a limited number of product while a blocker mechanism restricts access to remaining product housed in the device. The devices also include a pushing assembly that provides controlled advancement of the product housed in the device. As a first product is removed from the device, the products located behind the one that was removed must move forward. In some embodiments, the pushing assembly includes a resistance mechanism that is coupled to the track and the pusher and that controls forward movement of the pusher along the track and thereby controls the speed at which product is advanced for access by the consumer. The pushing assembly also includes a stop mechanism that is engaged when the door assembly is in the open position. When engaged, the stop mechanism prevents the pushing assembly from advancing product forward.

BRIEF DESCRIPTION OF THE DRAWINGS

FIG. 23 is a side plan view of the controlled access device of FIG. 21, shown in the closed position.

FIG. 24 is an enlarged view of the controlled access device of FIG. 23, taken at inset circle C.

DETAILED DESCRIPTION

Figure 1:
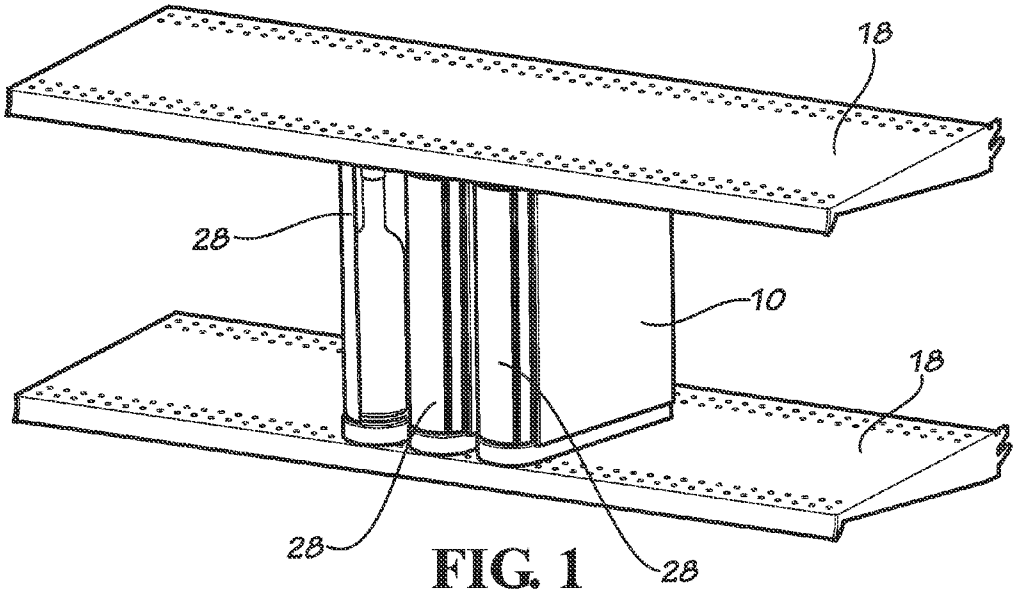
FIG. 1 is a perspective view of three assembled controlled access devices positioned between shelving units according to one embodiment.

Certain embodiments comprise a controlled access device that houses product and that includes a blocker mechanism that restricts access to product housed within the device when a door assembly of the device is in the open position. One embodiment of a controlled access device, device 10, is shown in FIGS. 1-7. In some embodiments, one or more controlled access devices 10 fit between two shelving units 18, as shown in FIG. 1. Alternatively, one or more controlled access devices 10 may be positioned on a single shelving unit, or placed on any surface such as a countertop.

As described in more detail below, controlled access device 10 comprises a pushing assembly 100 for controlled advancement of product and a door assembly 12 having a cover 28 that acts as a blocker mechanism. Controlled access device 10 also includes a hood 14 that cooperates with a base 16 and with door assembly 12. Controlled access device 10 has an open position and a closed position. Specifically, door assembly 12 is configured to revolve about its longitudinal axis L (FIG. 8) between an open position and a closed position. Whether in the open or closed position, consumer access to products stored within the device 10 is restricted by the cover 28.

Figure 3:
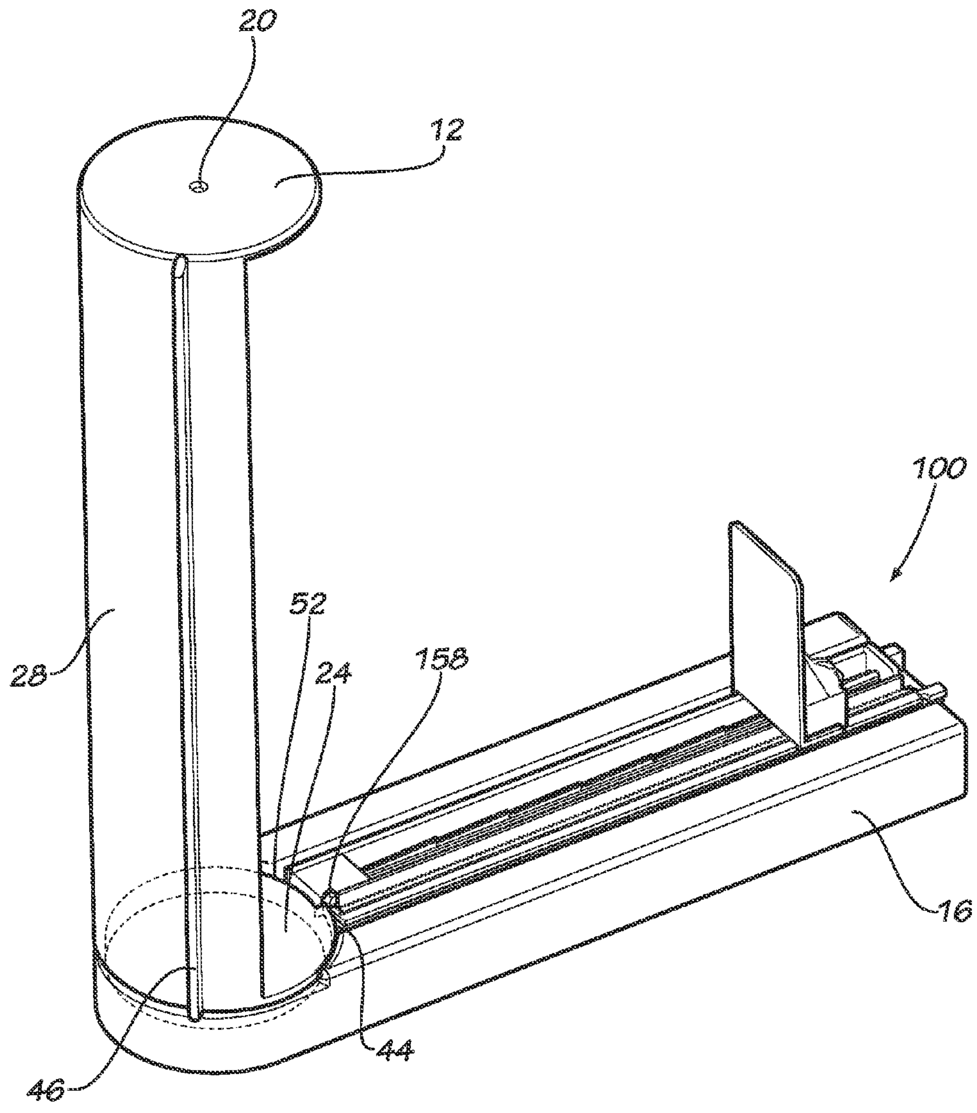
FIG. 3 is a partial perspective view of the door assembly and the pushing assembly of one of the controlled access devices of FIG. 1.
Figure 4:
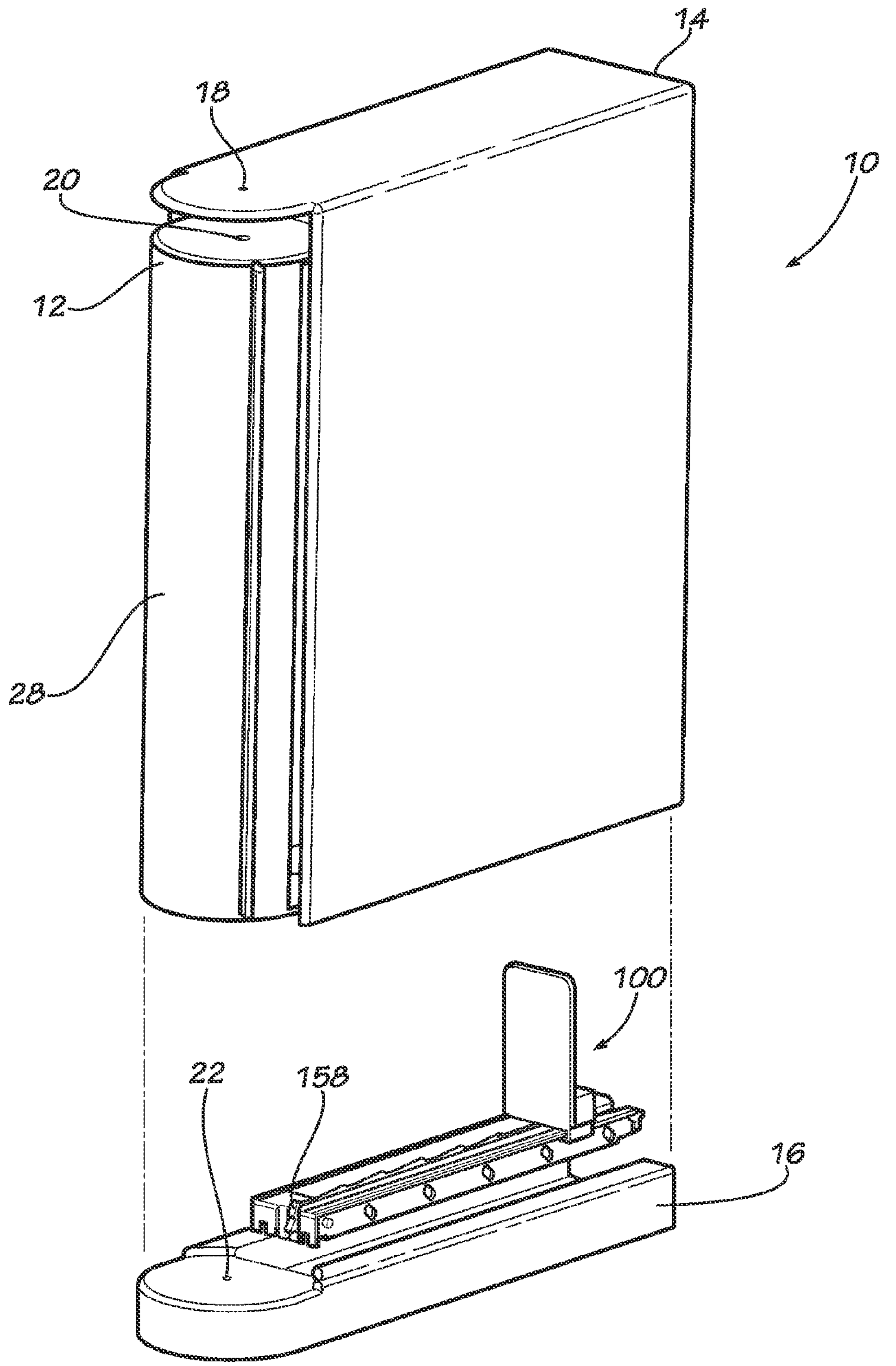
FIG. 4 is an exploded view of one of the controlled access devices of FIG. 1.
Figure 5:
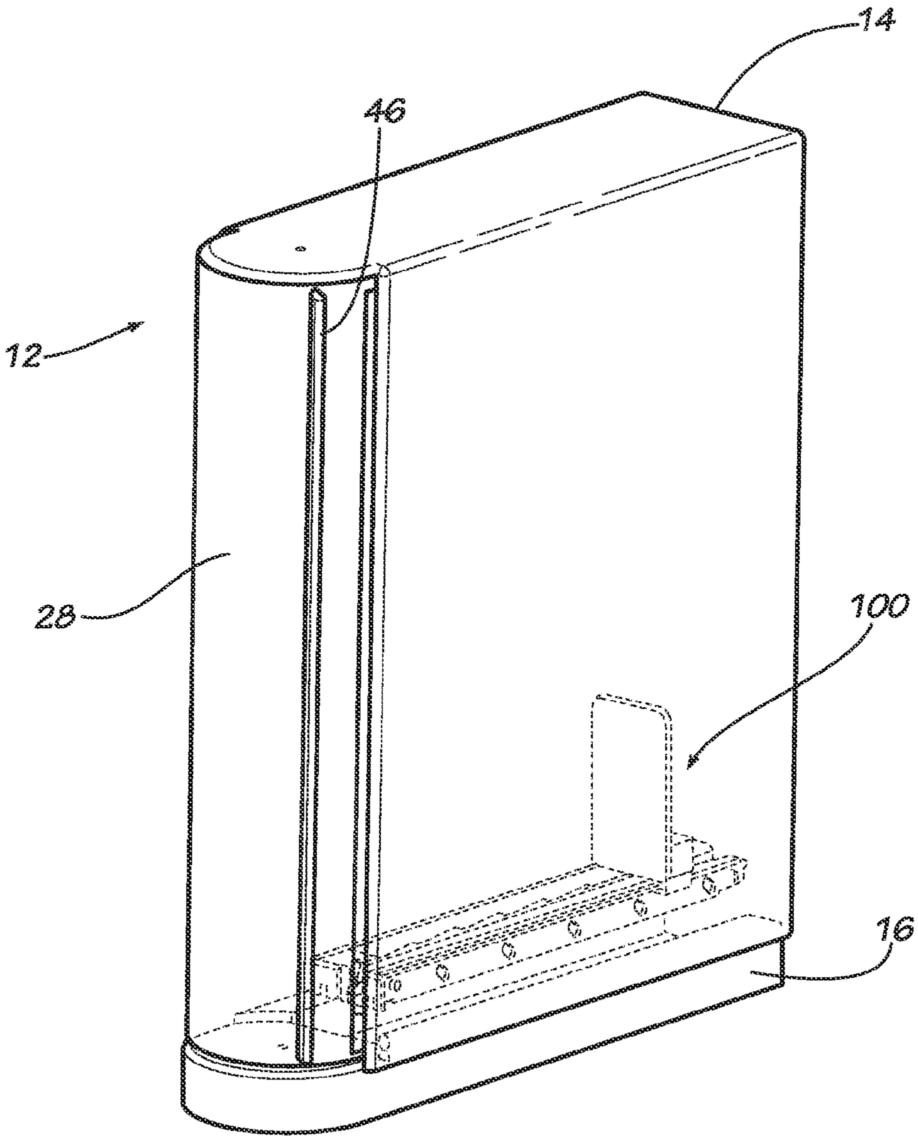
FIG. 5 is perspective view of one of the controlled access devices of FIG. 1, with the pushing assembly shown in ghosted lines.

As shown in FIGS. 3-4, door assembly 12 and pushing assembly 100 are assembled with the base 16, and the hood surrounds the pushing assembly 100 and a portion of the door assembly 12 to prevent side and top access to the interior of the device 10. Specifically, the hood 14 interfits with the base 16 in any suitable manner, and also attaches to the top portion of the door assembly 12 in any suitable manner. As shown in FIGS. 4-5, base 16 is sized and shaped to receive the pushing assembly 100, described in more detail below.

In some embodiments, the top of the hood 14 includes an aperture 18 that aligns with an aperture 20 in the top of the door assembly 12 (FIG. 4), and through which a screw or other suitable fastener (not shown) may pass to secure the hood 14 to the door assembly 12. Similarly, the base 16 may include one or more apertures 22 (FIG. 4) that aligns with an aperture 26 (FIG. 8) in the bottom plate 24 of the door assembly 12 and through which a screw or other suitable fastener (not shown) may pass to secure the door assembly 12 to the base 16. Door assembly 12 may be coupled to hood 14 and base 16 in any suitable manner, so long as the bottom plate 24 of the door assembly 12 is free to revolve about its longitudinal axis L. Door assembly may be spring-loaded. For example, a spring may be located on the underside of bottom plate 24 or in any other suitable location to urge door assembly from its open position to its closed position. In addition, a damper feature may be included so that the door assembly does not slam shut.

Figure 6:
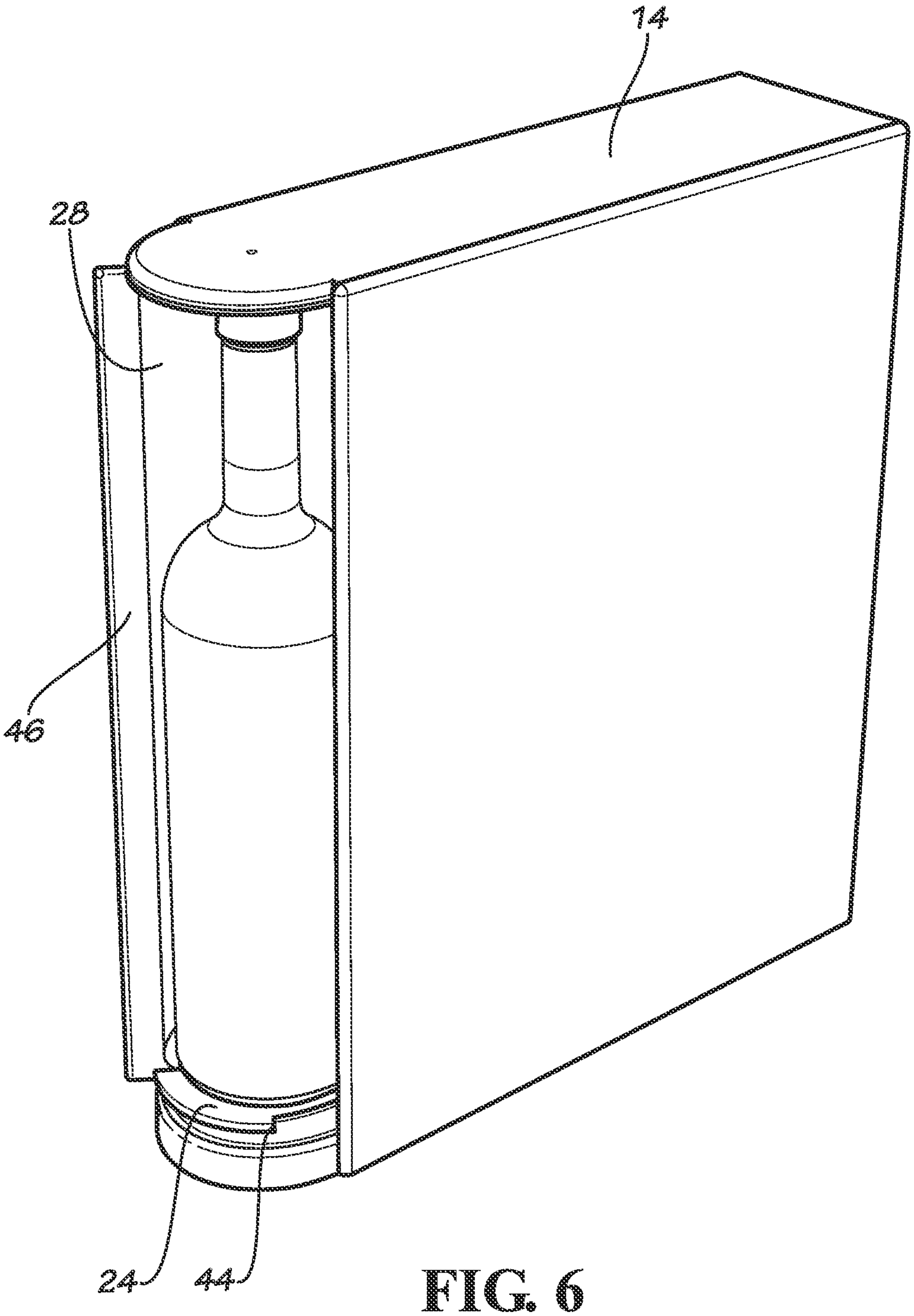
FIG. 6 is a perspective view of one of the controlled access devices of FIG. 1, shown in the open position and shown with product.
Figure 7:
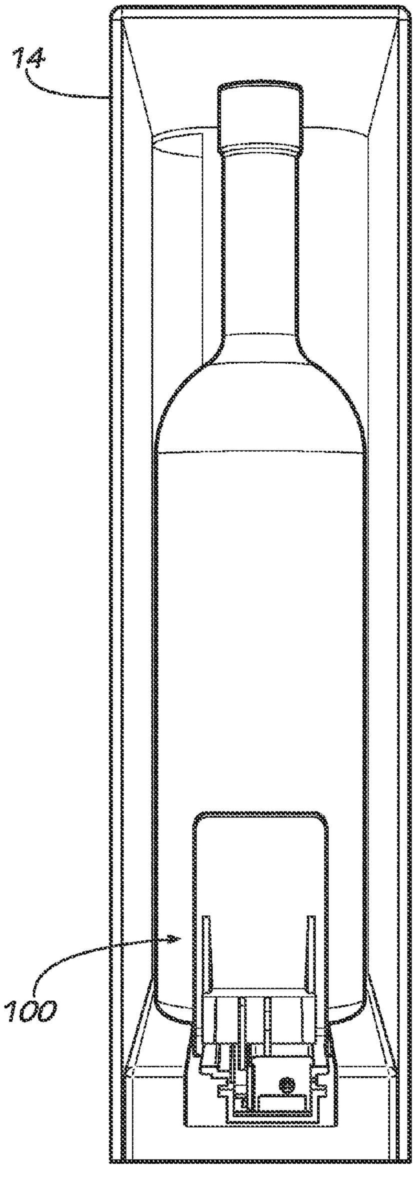
FIG. 7 is a rear view of one of the controlled access devices of FIG. 1, shown with product.
Figure 10:
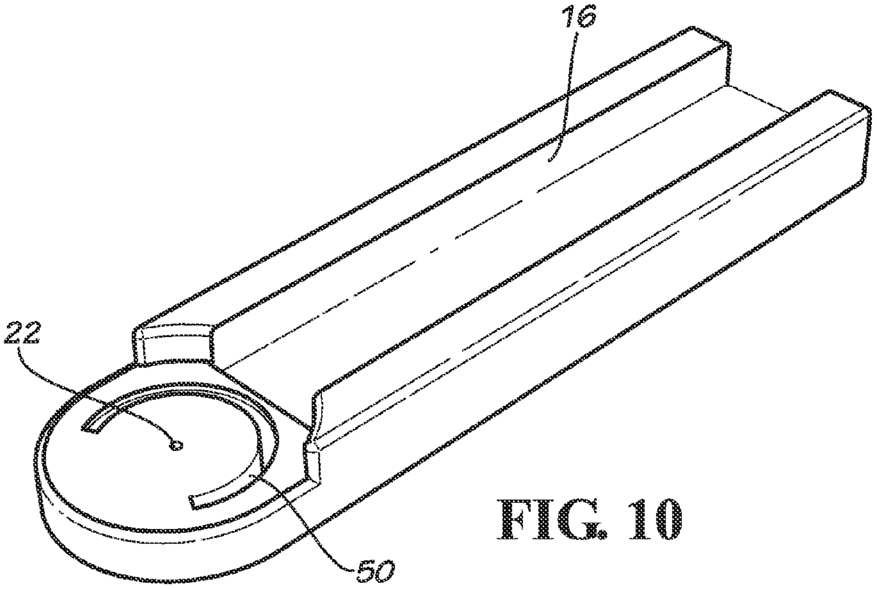
FIG. 10 is a perspective view of the base of one of the controlled access devices of FIG. 1.

In some embodiments, the top of the hood 14 and/or the base 16 includes one or more grooves (such as groove 50 shown in FIG. 10). In these embodiments, the door assembly has one or more projections (such as projection 48 shown in FIG. 8) configured to be received within the one or more grooves and traverse along the one or more grooves as the door assembly 12 revolves between its open position and its closed position. As shown in FIGS. 1, 3, and 6, bottom plate 24 of door assembly 12 also includes an engaging mechanism 44, which can be a notch, aperture, elongated/offset surface, cam, protrusion, or other suitable mechanism, that interacts with pushing assembly 100, as further explained below. As illustrated, engaging mechanism 44 is an offset surface.

Figure 8:
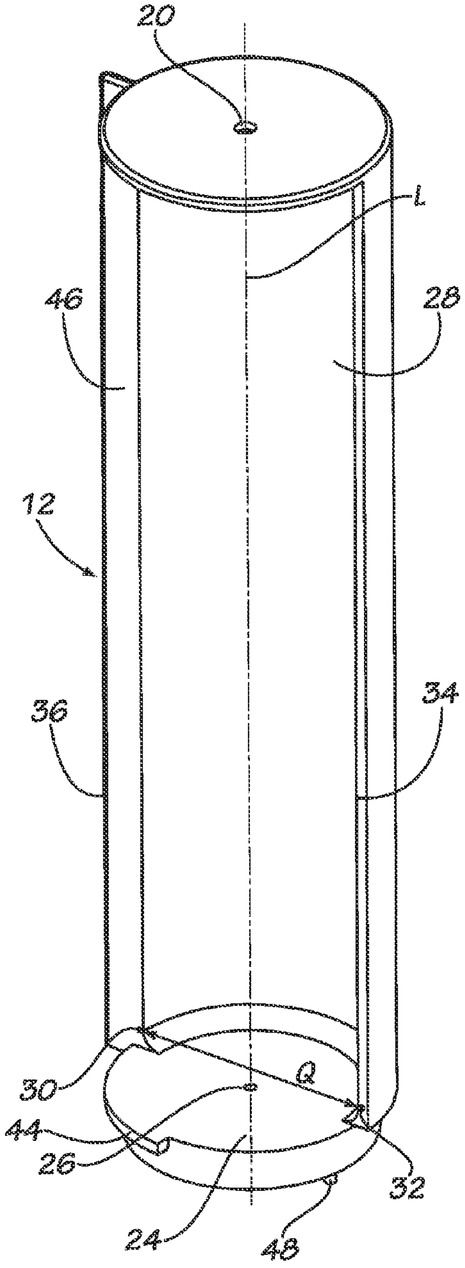
FIG. 8 is a perspective view of the door assembly of FIG. 3, shown in the open position.
Figure 9:
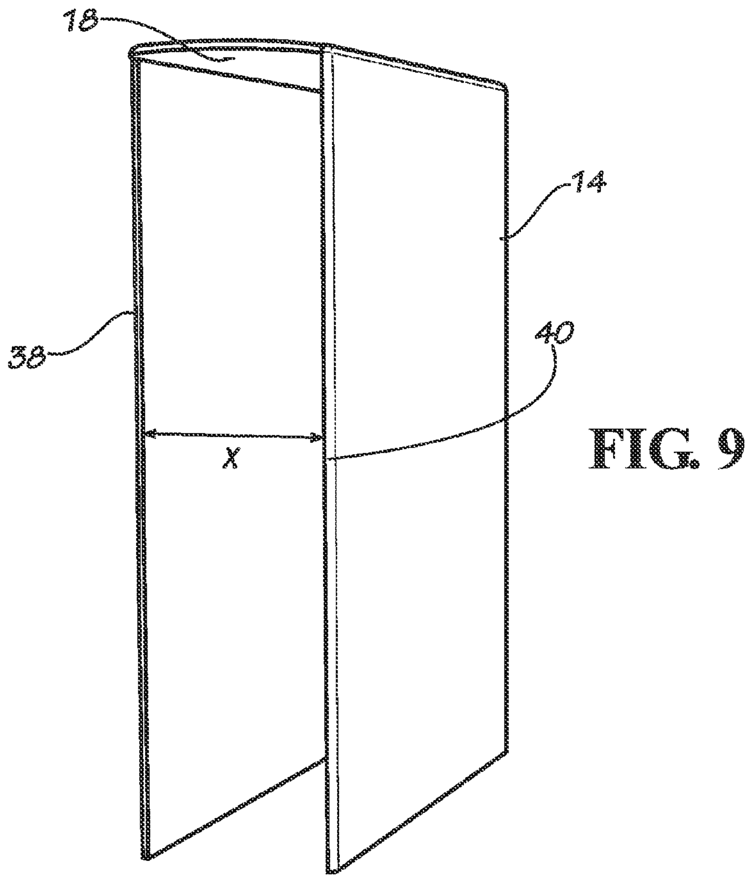
FIG. 9 is a perspective view of the hood of one of the controlled access devices of FIG. 1.

Door assembly 12 has any suitable geometry. As shown, the bottom plate 24 of door assembly 12 is sized and shaped to receive a round product, such as a bottle, although bottom plate 24 could have other shapes and sizes depending on the dimensions of the product(s) to be housed in the device. As shown in FIG. 8, bottom plate 24 is circular and has a diameter Q that is slightly larger than the diameter of the product housed in device 10. Diameter Q of the bottom plate 24 is also slightly smaller than the width X of the hood 14 (FIG. 9) so that the hood 14 snugly fits around the door assembly 12.

As shown in FIGS. 3 and 8 and as mentioned above, door assembly 12 includes a cover 28, which in some embodiments is formed of any suitable plastic or other material, that generally extends between the top of the door assembly 12 and the bottom plate 24 of door assembly 12 and that extends around a portion of the periphery of the bottom plate 24. Since bottom plate 24 is circular, cover 28 is therefore curved. In this way, cover 28 and door assembly 12 form a semi-cylindrical hollow assembly. In some embodiments, cover 28 is clear or translucent so that a consumer can see product housed within device 10.

In the illustrated embodiment, as shown in FIG. 8, cover 28 extends from a first point 30 along the periphery of bottom plate 24 to a second point 32 along the periphery of the bottom plate 24, where the first point 30 is spaced about 180 degrees from the second point 32 (in other words, first point 30 and second point 32 are at opposite ends of diameter Q of the bottom plate, or on opposite sides of the bottom plate). As explained above, diameter Q of the bottom plate 24 is slightly smaller than the width X of the hood 14. Thus, the cover 28 is dimensioned so that, when the door assembly is the closed position, the left side 34 of the cover 28 abuts the left side 38 of the hood and the right side 36 of the cover 28 abuts the right side 40 of the hood and so that the cover 28 blocks access to product housed within device 10, including any product received on the bottom plate 24. Moreover, in the closed position, the convex side of curved cover 28 is facing the consumer.

As mentioned above, the door assembly 12 is coupled to the base 16 and the hood 14 so that it is free to revolve about its longitudinal axis L from the closed position to the open position. As the door assembly 12 revolves, the bottom plate 24 revolves, which in turn revolves the cover 28. As door assembly 12 moves from its closed position to its open position, cover 28 revolves so that the left side 34 of the cover 28 abuts the right side 40 of the hood and the right side 36 of the cover 28 abuts against the left side 38 of the hood 14. In the open position, the concave side of cover 28, which is located behind any product housed on bottom plate 24, is facing the consumer so that a consumer has access to any product housed on bottom plate 24 (see FIG. 6), but does not have access to product located behind cover 28 within the device 10. In particular, although a consumer now has access to the bottom plate 24 (and any product received on bottom plate 24), cover 28 still extends across the width X of the hood 14 to block access to the interior of the device 10 (see FIG. 6, for example). In this way, the cover 28 acts as a blocker that restricts access to any product housed inside the device 10 even when the door assembly 12 is in the open position.

Moreover, because cover 28 extends along the periphery of the bottom plate 24 from generally a first end of diameter Q to generally a second end of diameter Q (diameter Q being only slightly smaller than width X of the hood 14), cover 28 at least partially blocks access to the interior of the device regardless of the door assembly's degree of revolution. Moreover, because width X of the hood is only slightly larger than the diameter and/or width of the product housed within the device and because cover 28 always extends at least partially across the width X of the hood, the cover 28 acts as a blocking mechanism regardless of the orientation of the cover. In other words, even when the cover is rotated to a point between the door assembly's open and closed position, product is not able to fit beyond the cover 28 for removal out of device 10.

In some embodiments, as shown in FIGS. 6 and 8, cover 28 includes a lip 46 that a user can grasp to facilitate the opening and closing of door assembly 12. In the embodiment illustrated, lip 46 extends from the top of the door assembly 12 to the bottom plate 24 of the door assembly 12. In other embodiments, lip could be positioned elsewhere along the cover and/or may extend only partially along the height of the cover.

As shown in FIGS. 1 and 6, product, such as a bottle or other product, is received on bottom plate 24 of the door assembly 12 so that a consumer may access the product when the door assembly is in the open position. As a first product is removed from device, pushing assembly 100, in certain circumstances, causes products located behind the one that was removed to move forward toward the bottom plate 24 of the cover.

Figure 11:
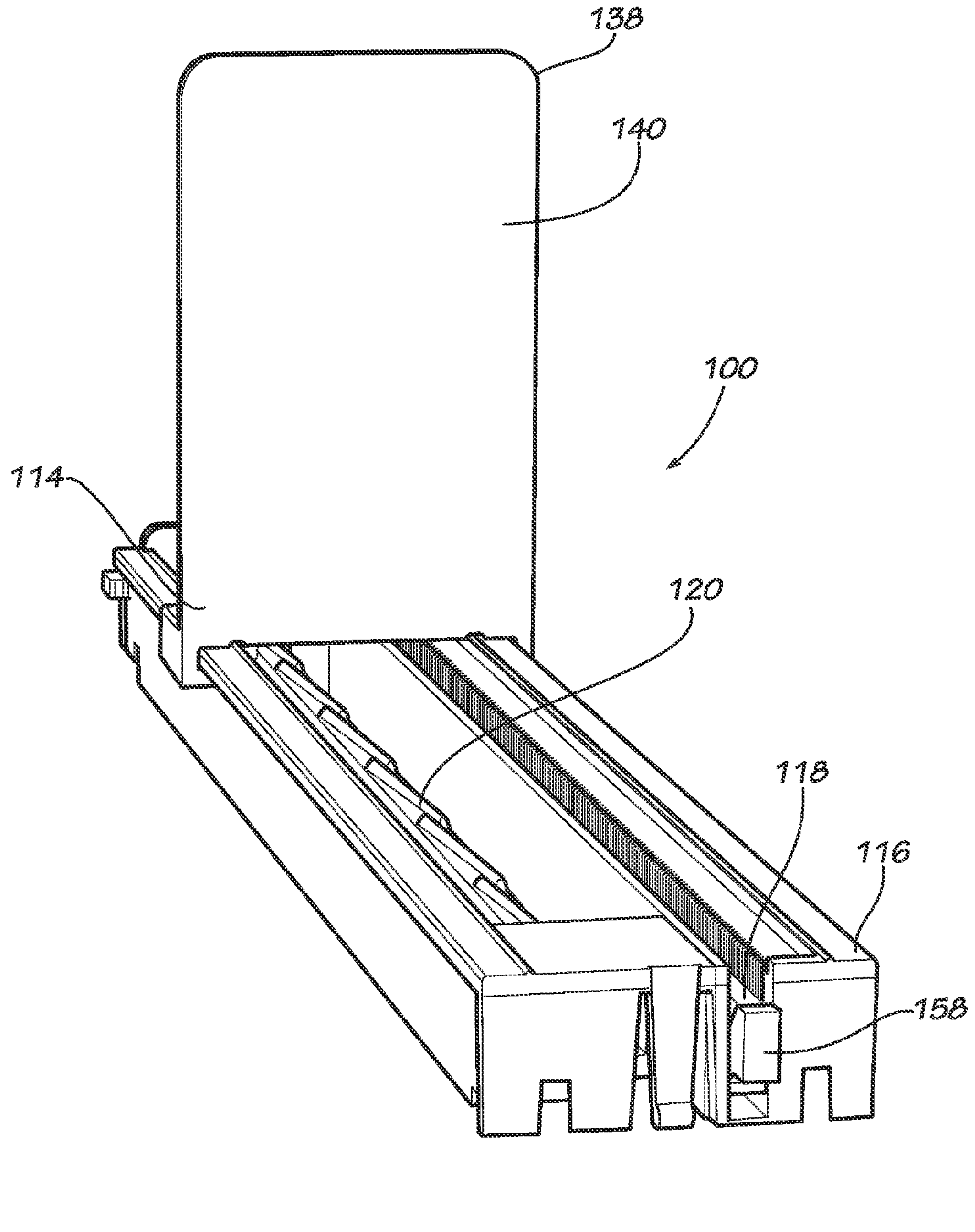
FIG. 11 is a front perspective view of the pushing assembly of one of the controlled access devices of FIG. 1.
Figure 12:
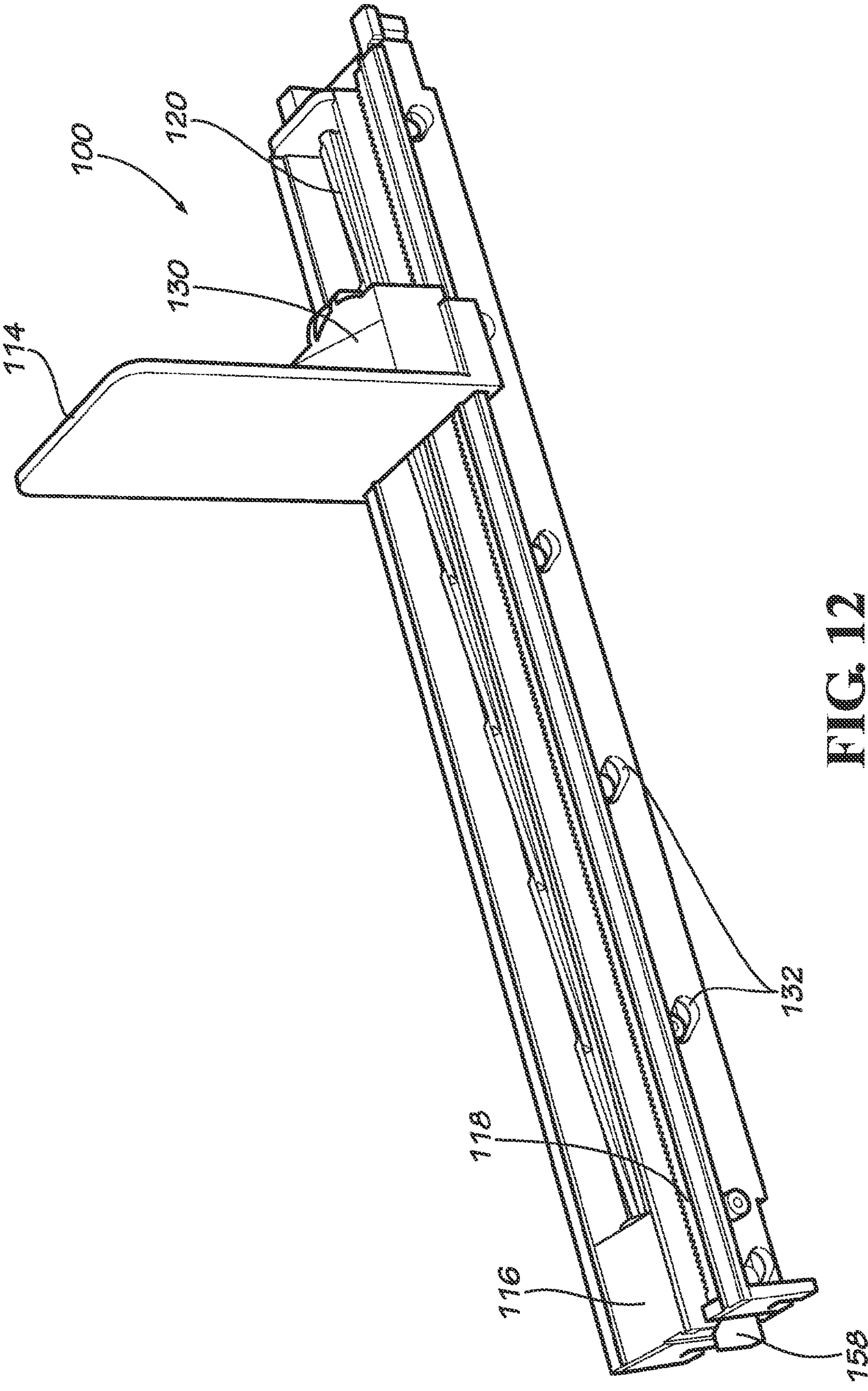
FIG. 12 is a side perspective view of the pushing assembly of FIG. 11.
Figure 20:
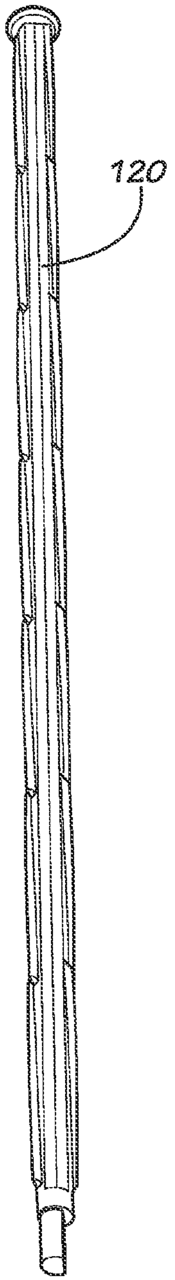
FIG. 20 is a perspective view of the shaft of the pushing assembly of FIG. 11.

As shown in FIGS. 11-12, in some embodiments, pushing assembly 100 comprises a pusher 114, a track 116, a resistance mechanism 130, a stop 118, and an optional shaft 120 (FIG. 20). Pusher 114 includes a pushing ram 138 that engages product and pushes product forward. Pushing ram 138 includes a front surface 140 for engaging product and a rear surface 142. The pushing ram 138 is illustrated as a rectangular plate, although other suitable shapes and geometries may also be used.

Figure 16:
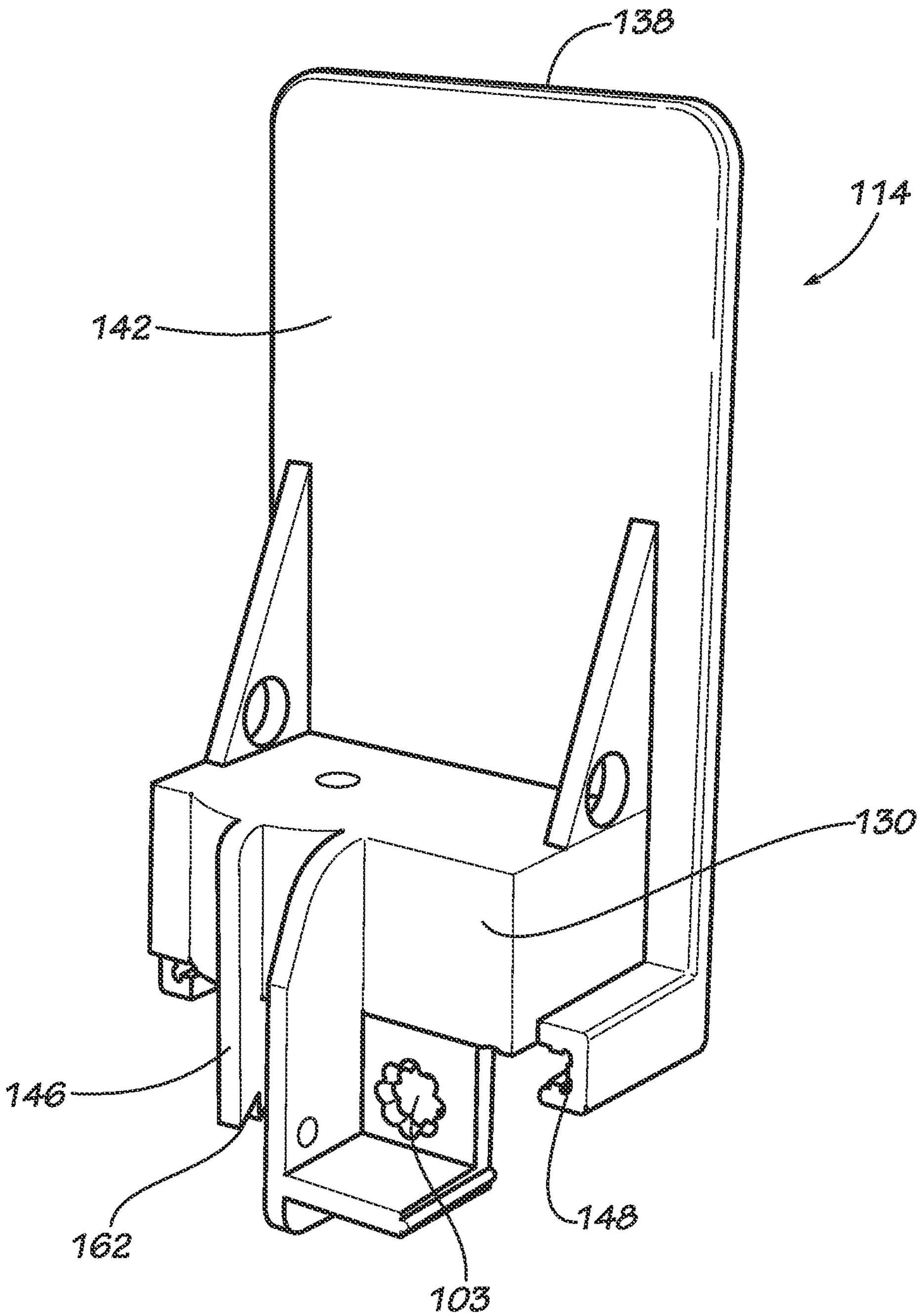
FIG. 16 is another rear perspective view of the pusher of FIG. 14.

As shown in FIG. 16, extensions 148 of pusher 114 extend beyond the bottom portion of pushing ram 138 to engage track 116 so that pusher 114 is in sliding engagement with track 116. In certain embodiments, pushing assembly 100 also includes a shaft 120 (further discussed below) that extends through an aperture 103 in the pusher 114.

Figure 18:
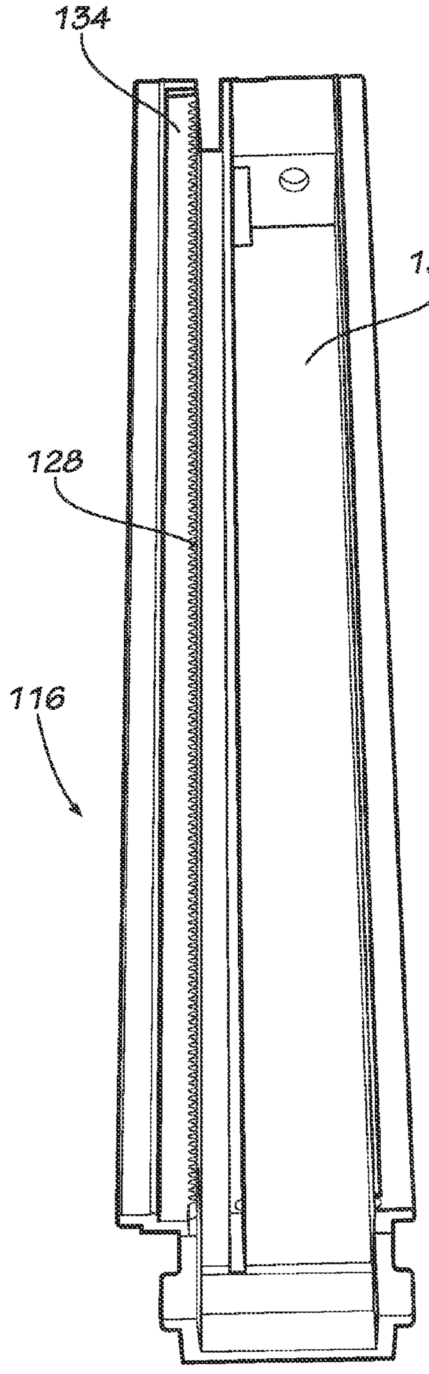
FIG. 18 is a top perspective view of the track of the pushing assembly of FIG. 11.

As shown in FIG. 18, track 116 includes a shaft channel 133, as well as a resistance channel 134 having gear teeth 128 that project into resistance channel 134 and engage external gear component 144 of the resistance mechanism 130, further described below. The gear teeth 128 may be positioned in various other manners along the resistance channel 134 and maintain the functionality of the device.

Figure 13:
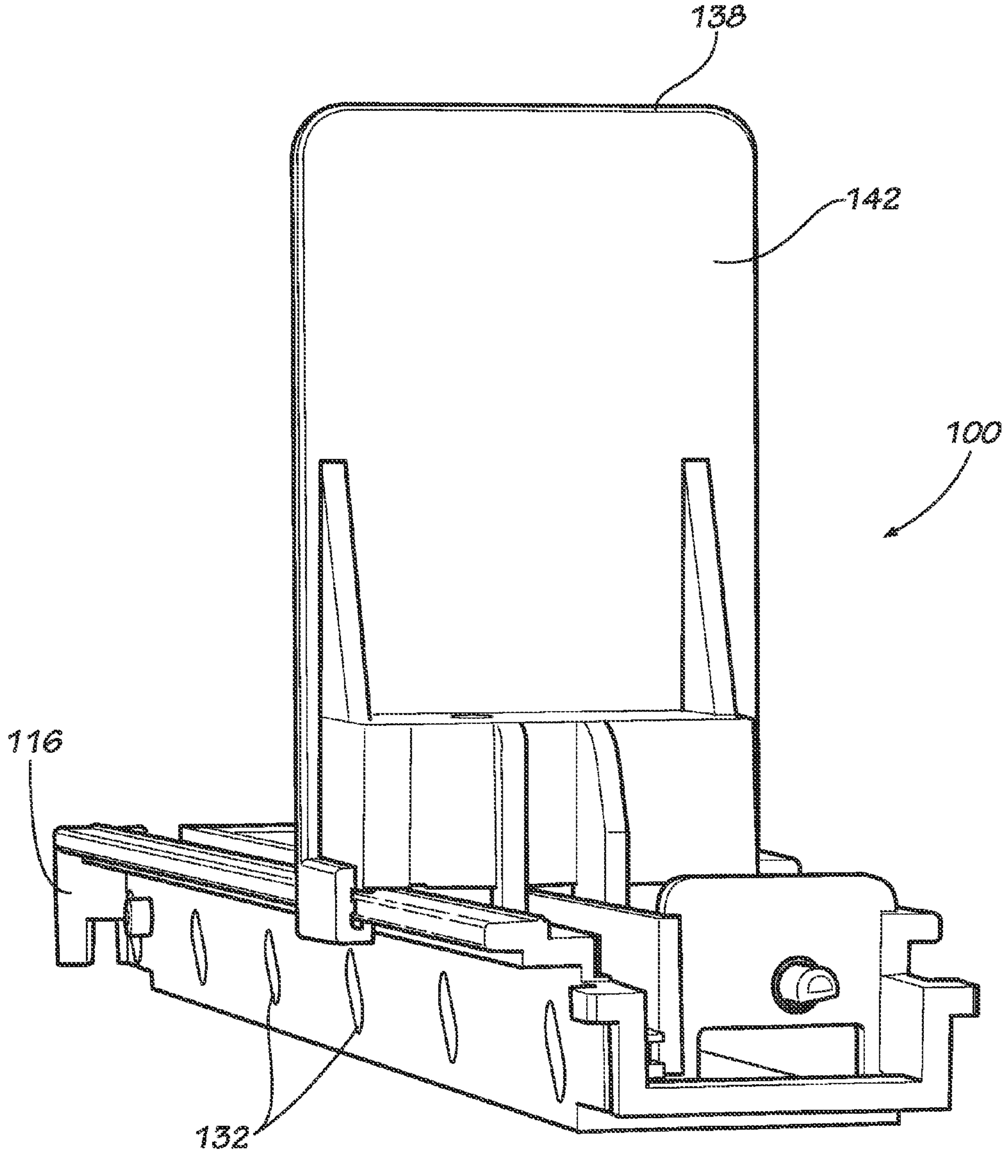
FIG. 13 is a rear perspective view of the pushing assembly of FIG. 11.
Figure 17:
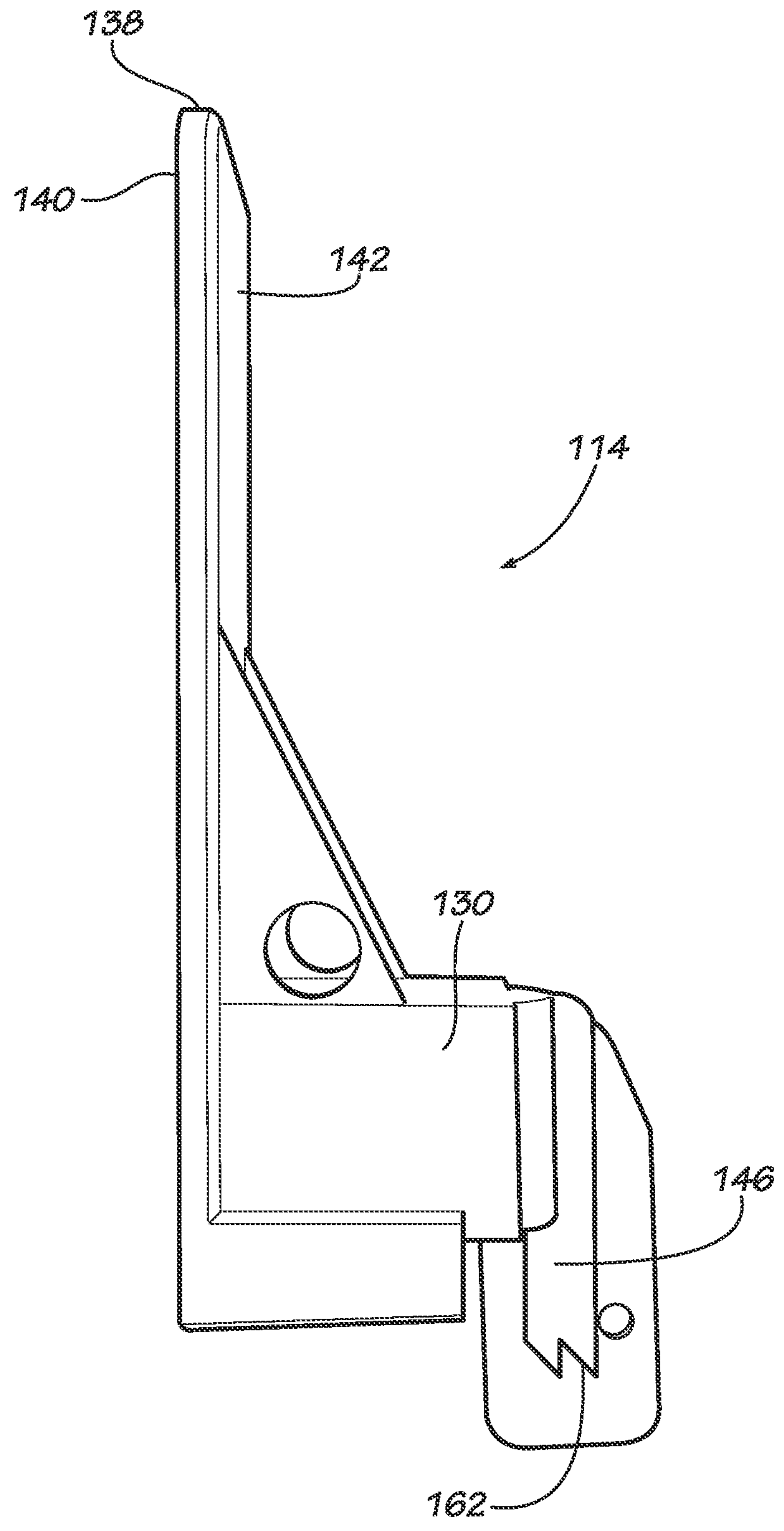
FIG. 17 is a side plan view of the pusher of FIG. 14.
Figure 19:
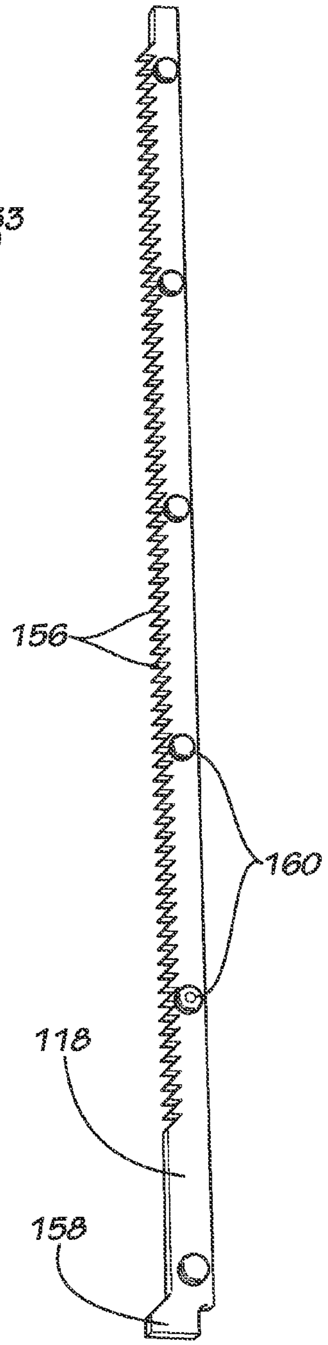
FIG. 19 is a side perspective view of the stop of the pushing assembly of FIG. 11.

As shown in FIGS. 11 and 19, in some embodiments, resistance channel 134 receives stop 118. As shown in more detail in FIG. 19, stop 118 includes a plurality of engagement surfaces 156, which form generally a sawtooth shape in cross section. Stop 118 also includes a front face 158, which may extend beyond the resistance channel 134. Front face 158 may have any suitable configuration: one such configuration is shown in FIG. 4 and another suitable configuration is shown in FIG. 11. Engagement surfaces 156 are positioned to engage projection 162 extending from brake 146 of pusher 114 (described below and shown in FIGS. 15-17). Stop 118 also includes one or more protrusions 160, which may be located on the side of stop 118, as shown in FIG. 19. As described below, these protrusions are shaped and sized to fit within one or more slots 132 in the side of track 116 (shown in FIGS. 12-13).

Figure 15:
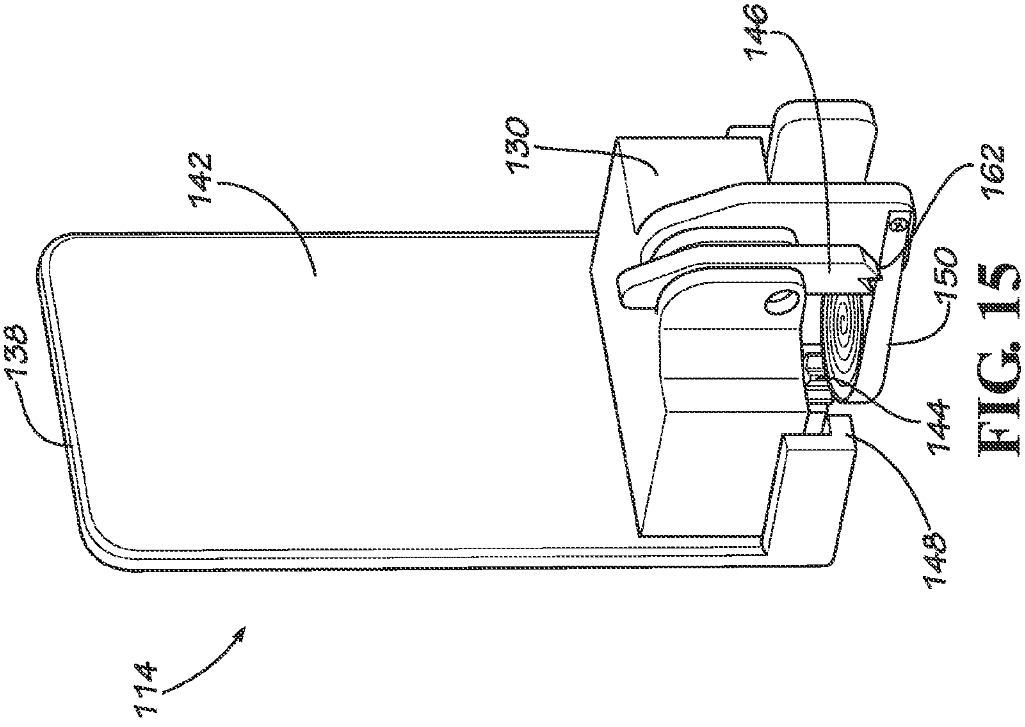
FIG. 15 is a rear perspective view of the pusher of the pushing assembly of FIG. 11.

As shown in FIG. 15, one end of spring 150 is attached to the pusher 114 in any suitable manner, such as, but not limited to, by a screw. Movement of pusher 114 towards the back end of the track 116 unwinds spring 150 so that when released, spring 150 urges pusher 114 in the forward direction. Spring 150 may be positioned anywhere along track in relation to pusher 114, so that spring 150 is capable of either "pushing" or "pulling" pusher 114 forward. The spring preferably may be a constant force spring, such as those sold under the trademark Conforce®, but many other types of springs, such as a variable force spring, may also be used.

Figure 14:
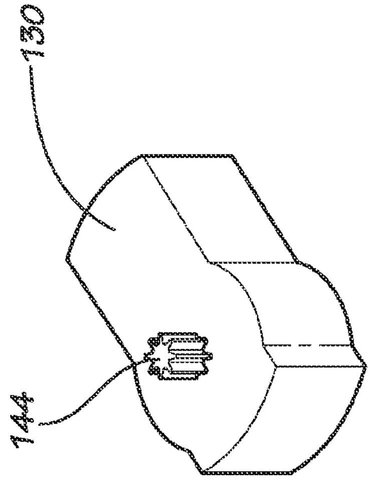
FIG. 14 is a perspective view of the resistance mechanism of the pushing assembly of FIG. 11.

In embodiments including a resistance mechanism 130, resistance mechanism 130 is attached to pusher 114. As shown in FIG. 14, resistance mechanism 130 includes external gear component 144. As shown in FIG. 15, resistance mechanism 130 is positioned on pusher 114 so that external gear component 144 extends into resistance channel 134 of track 116 and engages gear teeth 128. According to certain embodiments, one such resistance mechanism is a conventional resistance motor, such as used in toys, such as the resistance motor Model #w217 sold by Vigor, although other types of motors may also be used. In other embodiments, resistance mechanism 130 is a rotary damper.

As one product is selected from the front of pushing assembly 100, the winding of the spring 150 causes the pushing ram 138 to move forward and the external gear component 144 to rotate along gear teeth 128 of track 116. The movement of pushing ram 138 advances remaining product along track 116 and toward bottom plate 24. The speed of this forward movement is controlled and reduced by resistance mechanism 130. The internal gears of the resistance mechanism 130 are configured to provide resistance to the forward movement by limiting the rotation of the external gear component 144. Because the external gear component 144 engages gear teeth 128 of track 116 and the external gear rotation is limited, the movement of pushing ram 138 and therefore the remaining product to the front of track 116 is slowed.

Product can be loaded in pushing assembly 100 by forcing pushing ram 138 backwards along track 116 and placing multiple units of the product against the pushing ram 138. As described above, spring 150 pulls the pushing ram 138 to exert force on the products towards the front of the track 116. Resistance mechanism 130 preferably allows pushing ram 138 to be forced backwards freely for loading of the product.

In the embodiments having a shaft 120, shaft 120 is configured to rotate as the pusher 114 moves. Shaft 120 may be positioned to engage a position sensor, such as a potentiometer or other suitable device, as shaft 201 rotates, as described in U.S. Ser. No. 12/567,370 filed on Sep. 25, 2009, the contents of which are incorporated herein by reference. Shaft 120 may be helix shaped (or have other suitable shapes) and is positioned in relation to track 116 so that the shaft 120 is free to rotate without obstruction. As shown in FIG. 16, pusher 114 includes an aperture 103 cut in a shape corresponding to the shape of shaft 120 (i.e., helix geometry plus a small amount of tolerance if the shaft 120 is helix shaped) so that when the pusher 114 moves in a forward or backward direction, the linear motion of pusher 114 is converted into a rotary motion of the shaft 120.

Pushing assembly 100 includes a stop 118 that prevents the pusher 114 from advancing product forward when the stop is in an engaged position. When stop 118 is in the engaged position, the engagement surfaces 156 of the stop 118 engage the projections 162 of the brake 146 that extend into resistance channel 134. When projections 162 of the brake 146 engage the engagement surfaces 156 of the stop 118, stop 118 prevents forward movement of the pusher 114 and thus prevents the pusher from advancing product forward.

In some embodiments, when stop 118 is engaged, the pusher 114 can move in increments of a predetermined amount, such increments corresponding to the depth of the product. As explained above, the stop 118 includes engagement surfaces 156 that form generally a sawtooth shape in cross section. Stop 156 is positioned within resistance channel 134 so that protrusions 160 of stop 118 are received in ramped slots 132 on the side of the track 116 (shown in FIGS. 12-13). When sufficient force is applied to the front face 158 of stop 118, stop 118 moves from its engaged position to its disengaged position as the protrusions 160 on the side of the stop 118 move from one end of slots 132 to the other end of slots 132. Because slots 132 are sloped at an angle along track 116, the application of force to the front face 158 of stop 118 moves protrusions 160 downward in slots 132. In this way, when horizontal force is applied to the front face 158 of stop 118, stop 118 moves both horizontally toward the rear of the track 116 and downward at the same time so that stop 118 moves to its disengaged position. An additional spring 164 (shown in FIGS. 23-26, for example) may be used to slow the speed at which stop 118 returns to its disengaged position; this speed can be adjusted to correspond to the amount of time needed for the pusher 114 to move a predetermined increment, such increment corresponding, for example, to the depth of one product. Additional spring 164 may also be used to help pull the stop 118 from its disengaged to its engaged position.

Figure 2:
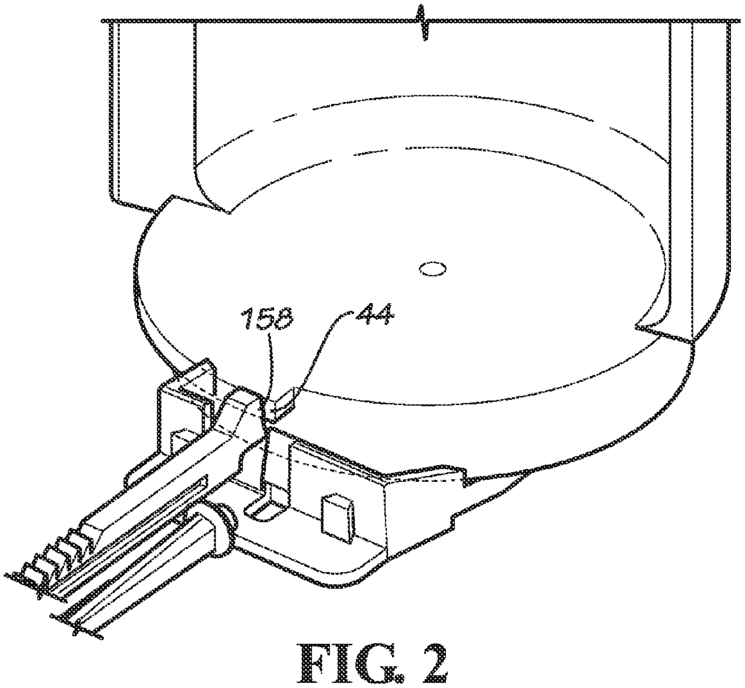
FIG. 2 is a partial perspective view of one of the controlled access devices of FIG. 1, shown with the door assembly in the closed position.

Pushing assembly 100 is assembled with respect to door assembly 12, which, as explained above, has a cover 28 that blocks access to the product housed on the bottom plate 24 when the door assembly 12 is in the closed position, and that blocks access to product stored on track 116 within device 10 when door assembly 12 is in both the closed and open position. As shown in FIGS. 2-3, engaging mechanism 44 of the door assembly 12 is configured to cooperate with stop 118 when the door assembly 12 is in the closed position. Specifically, as shown in FIG. 2, engaging surface 44 applies force to front face 158 of stop 118 when the door assembly 12 is in the closed position so that stop 118 is in its disengaged position and permits forward movement of the pusher 114. As door assembly 12 revolves into its open position (which allows a consumer to access product located on the bottom plate 24, but blocks access to product housed on pusher track 116), engaging mechanism 44 of the bottom plate 24 no longer engages the front face 158 of the stop 118 and stop 118 moves from its disengaged position to its engaged position and thus prevents forward movement of the pusher 114. In particular, when door assembly 12 is in the open position, edge 52 of bottom plate 24 (see FIG. 3) is positioned with respect to front face 158 and does not apply force to front face 158.

In an alternate embodiment, when sufficient force is applied to the front face 158 of the stop 118, the protrusions 160 on the side of the stop 118 move upward from one end of slots 132 to the other end of slots 132 to move the stop 118 from its disengaged position to its engaged position. Because slots 132 are sloped at an angle along track 116, movement of the protrusions 160 upward along the length of the slots 132 raises the stop 118 vertically from the disengaged position to its engaged position. In this way, when horizontal force is applied to the front face 158 of stop 118, such as by opening door assembly 12, stop 118 moves both horizontally toward the rear of the track 116 and upward at the same time. When stop 118 is raised to the engaged position, the engagement surfaces 156 of the stop 118 raise to engage the projections 162 of the brake 146 that extend into resistance channel 134. When projections 162 of the brake 146 are engaged with the engagement surfaces 156 of the stop 154, forward movement of the pusher 114 is restricted.

Figure 21:
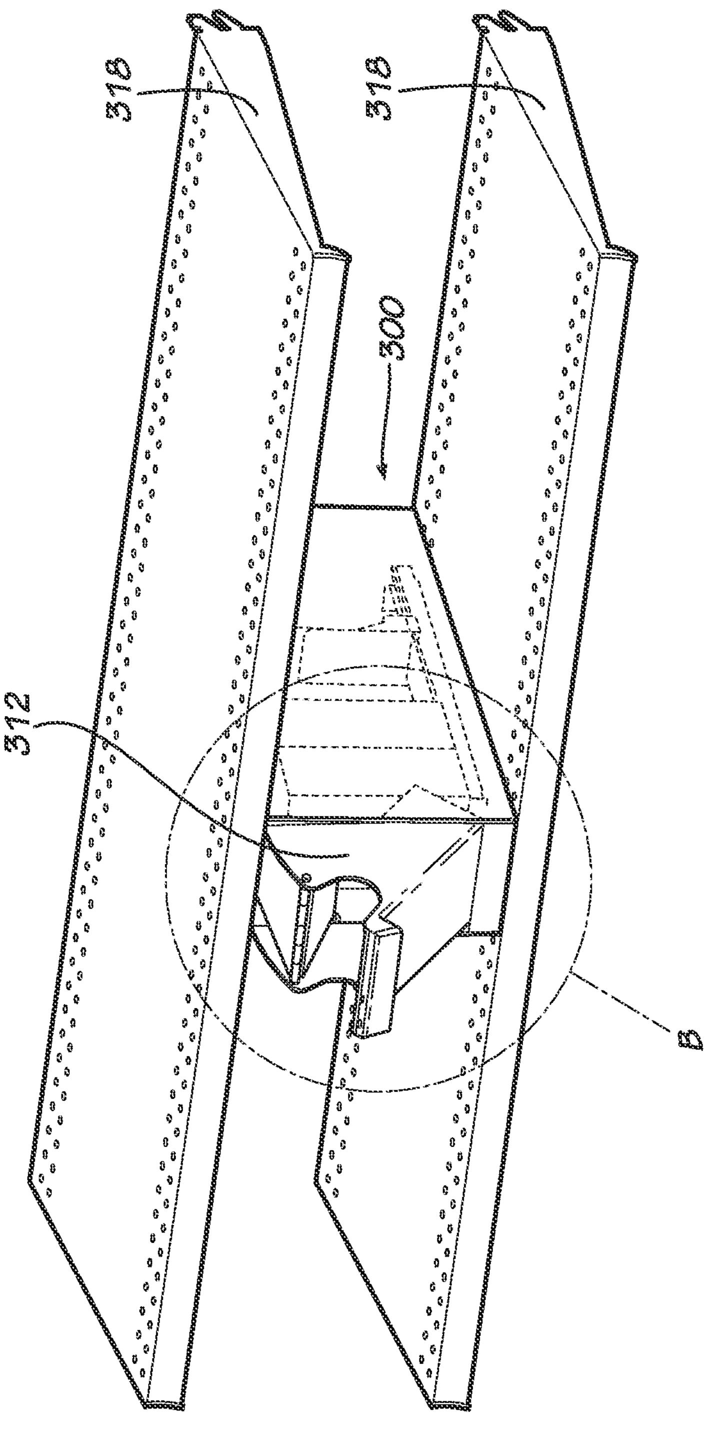
FIG. 21 is a sectional view of a controlled access device according to another embodiment, shown positioned between shelving units and shown with product and the pushing assembly in ghosted lines.
Figure 22:
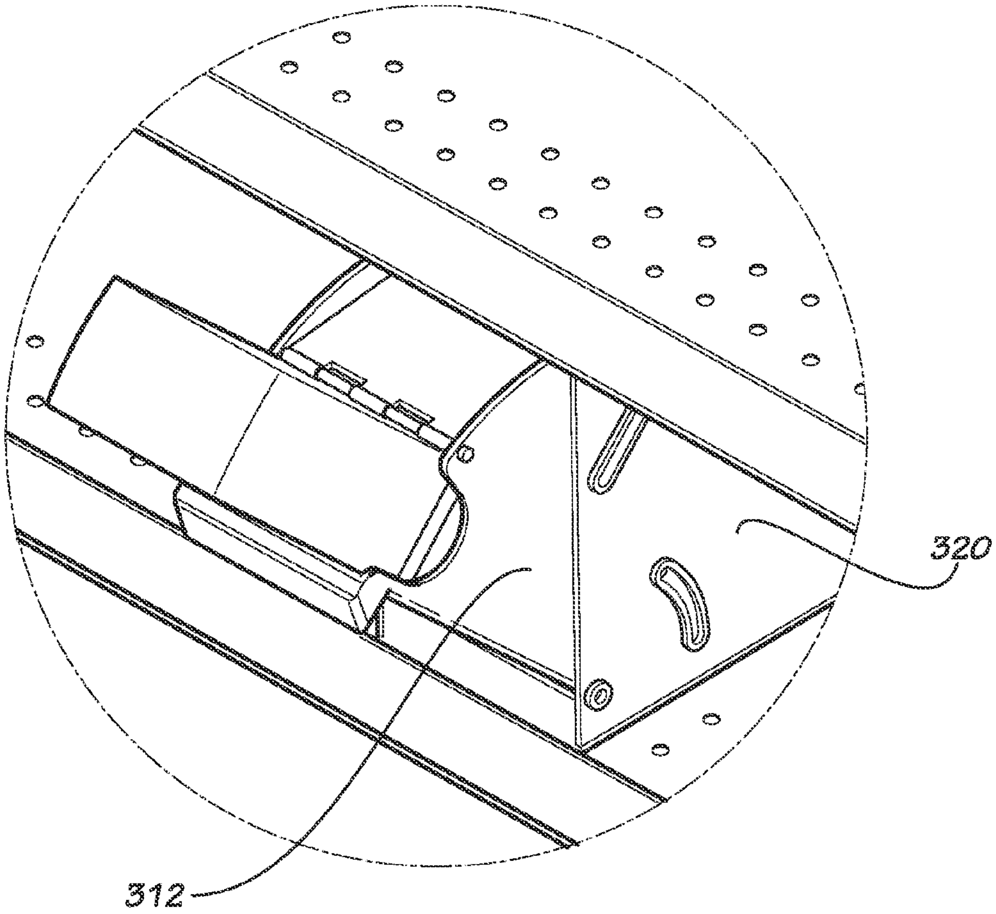
FIG. 22 is an enlarged view of the controlled access device of FIG. 21, taken at inset circle B.
Figure 25:
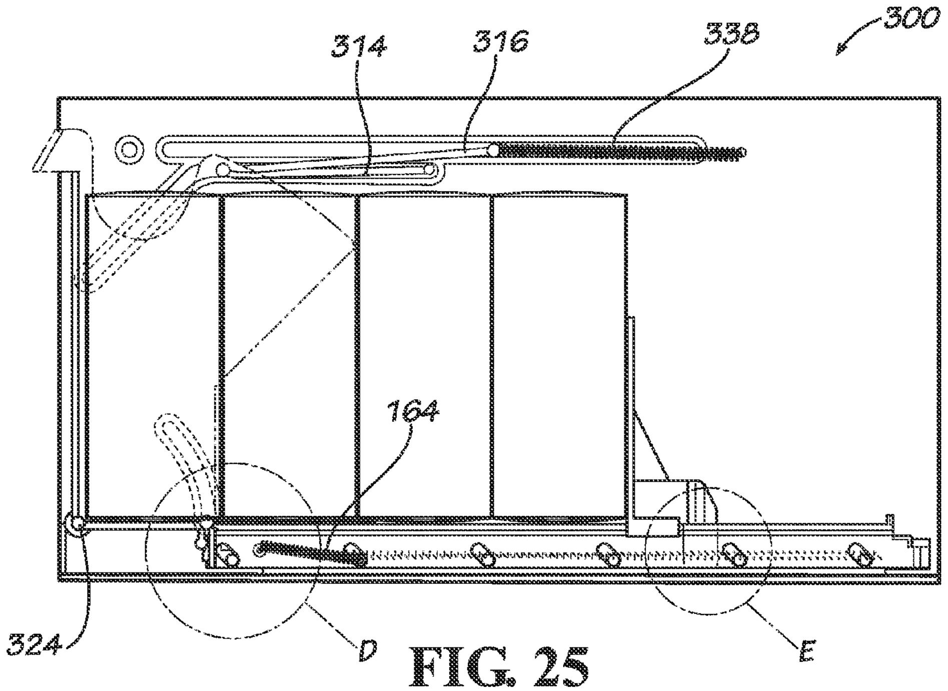
FIG. 25 is a sectional view of the controlled access device of FIG. 21, shown in the closed position.

Another embodiment of controlled access device, controlled access device 300, is shown in FIGS. 21-35. As shown in FIG. 21, controlled access device 300 may be positioned between shelving units 318. In other embodiments, controlled access device 300 may be positioned on a single shelving unit 318 or another type of free standing shelf such as a countertop.

Device 300 includes a door assembly 312 having an open position and a closed position, and at least one blocker that prevents access to remaining product housed within the device 300 when the door assembly is in the open position. A pushing assembly, such as pushing assembly 100 described above, is assembled with respect to door assembly 312, shown in FIG. 32.

Figure 28:
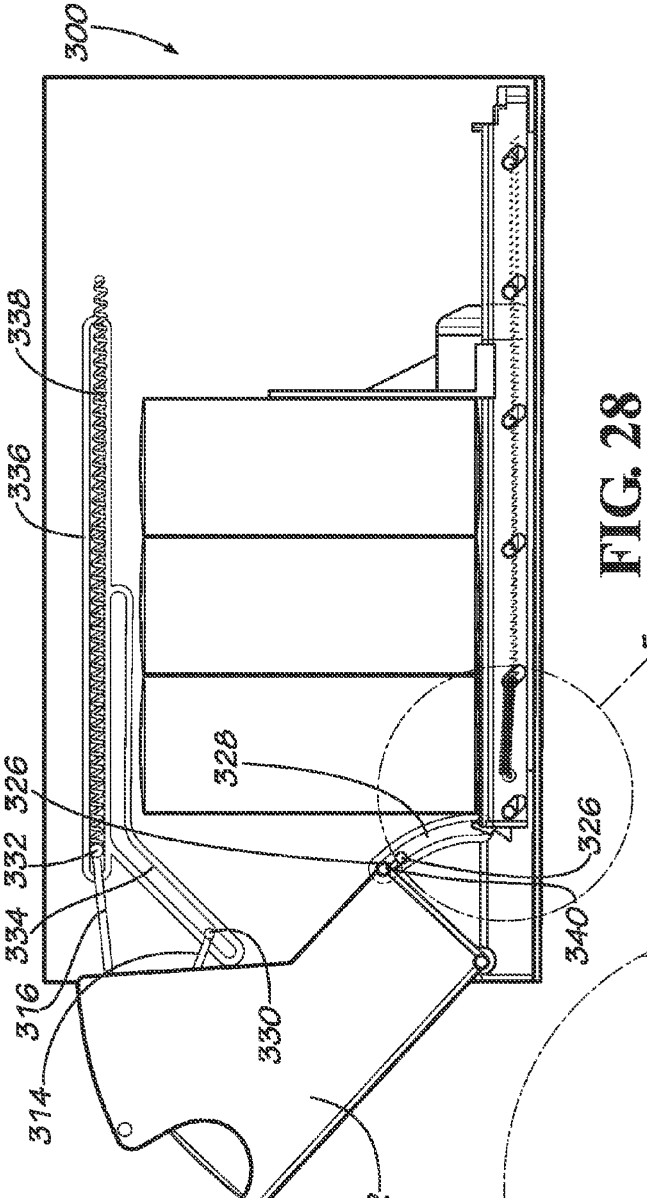
FIG. 28 is a side plan view of the controlled access device of FIG. 21, shown in the open position.
Figure 29:
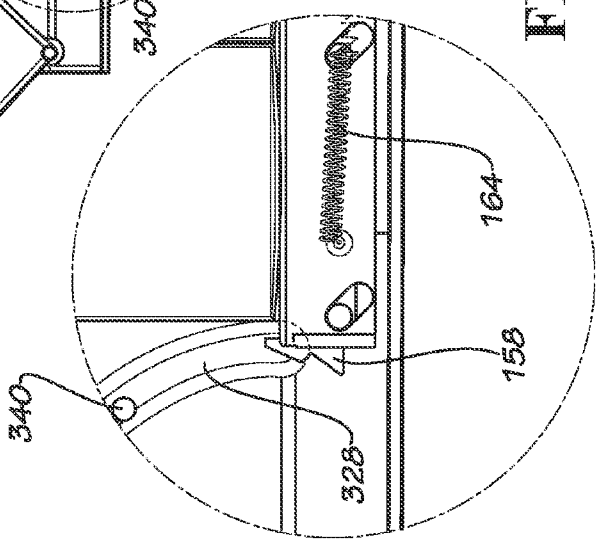
FIG. 29 is an enlarged view of the controlled access device of FIG. 28, taken at inset circle F.
Figure 30:
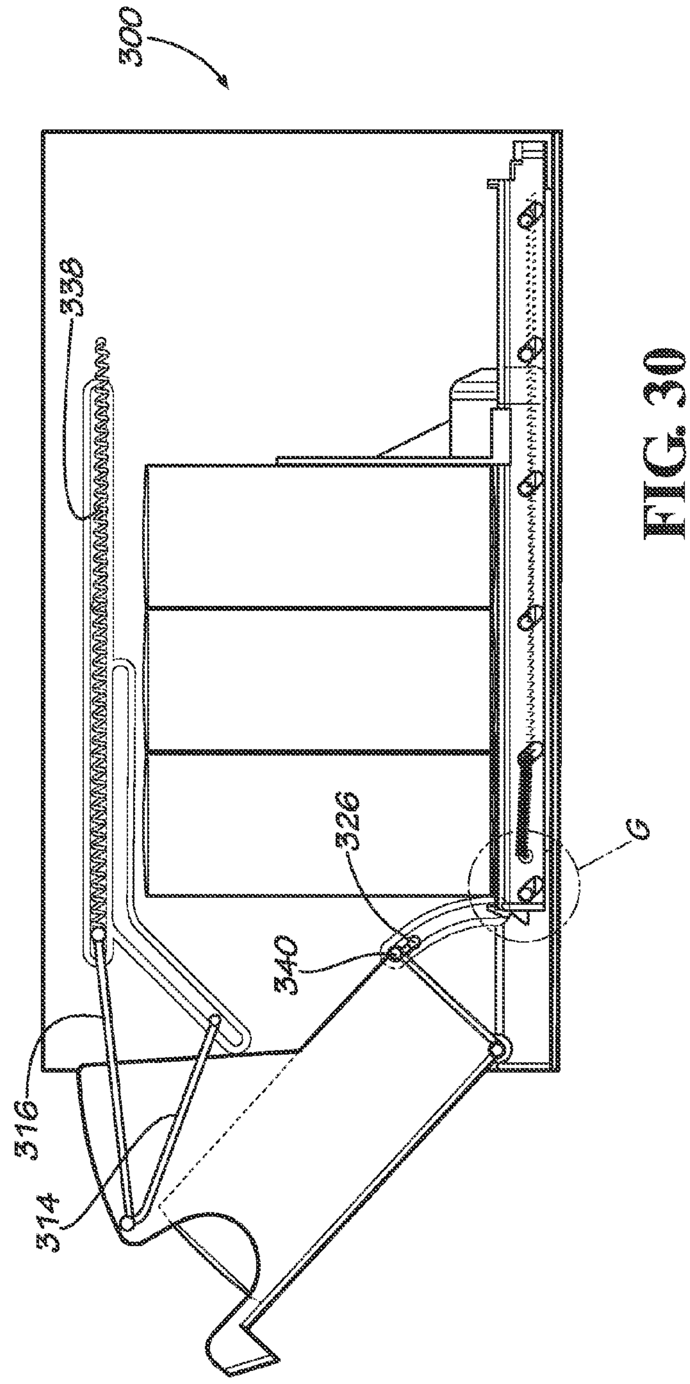
FIG. 30 is a sectional view of the controlled access device of FIG. 28.
Figure 31:
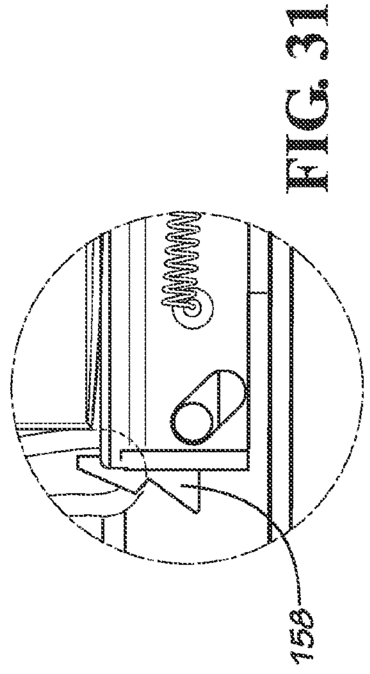
FIG. 31 is an enlarged view of the controlled access device of FIG. 30, taken at inset circle G.
Figure 32:
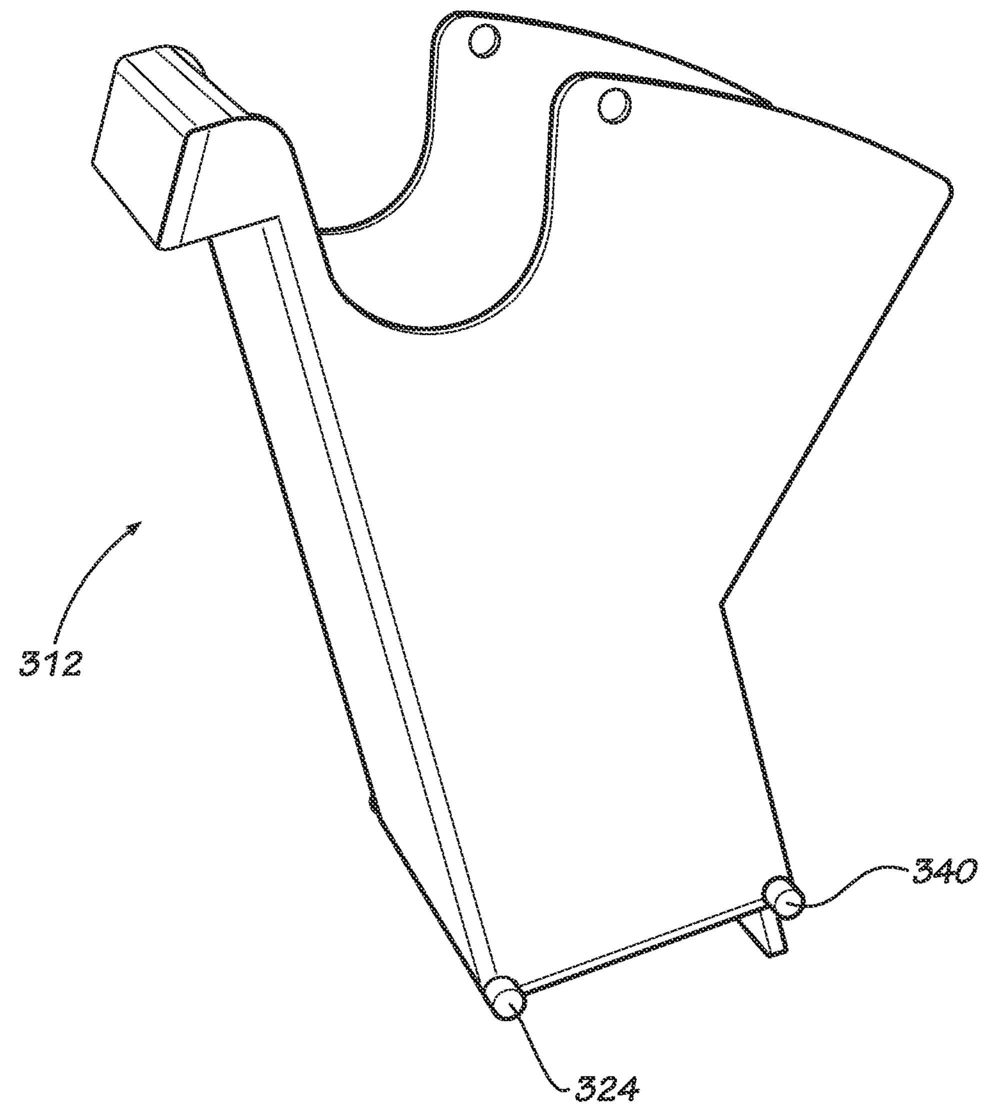
FIG. 32 is a perspective view of the door assembly of the controlled access device of FIG. 21.
Figure 33:
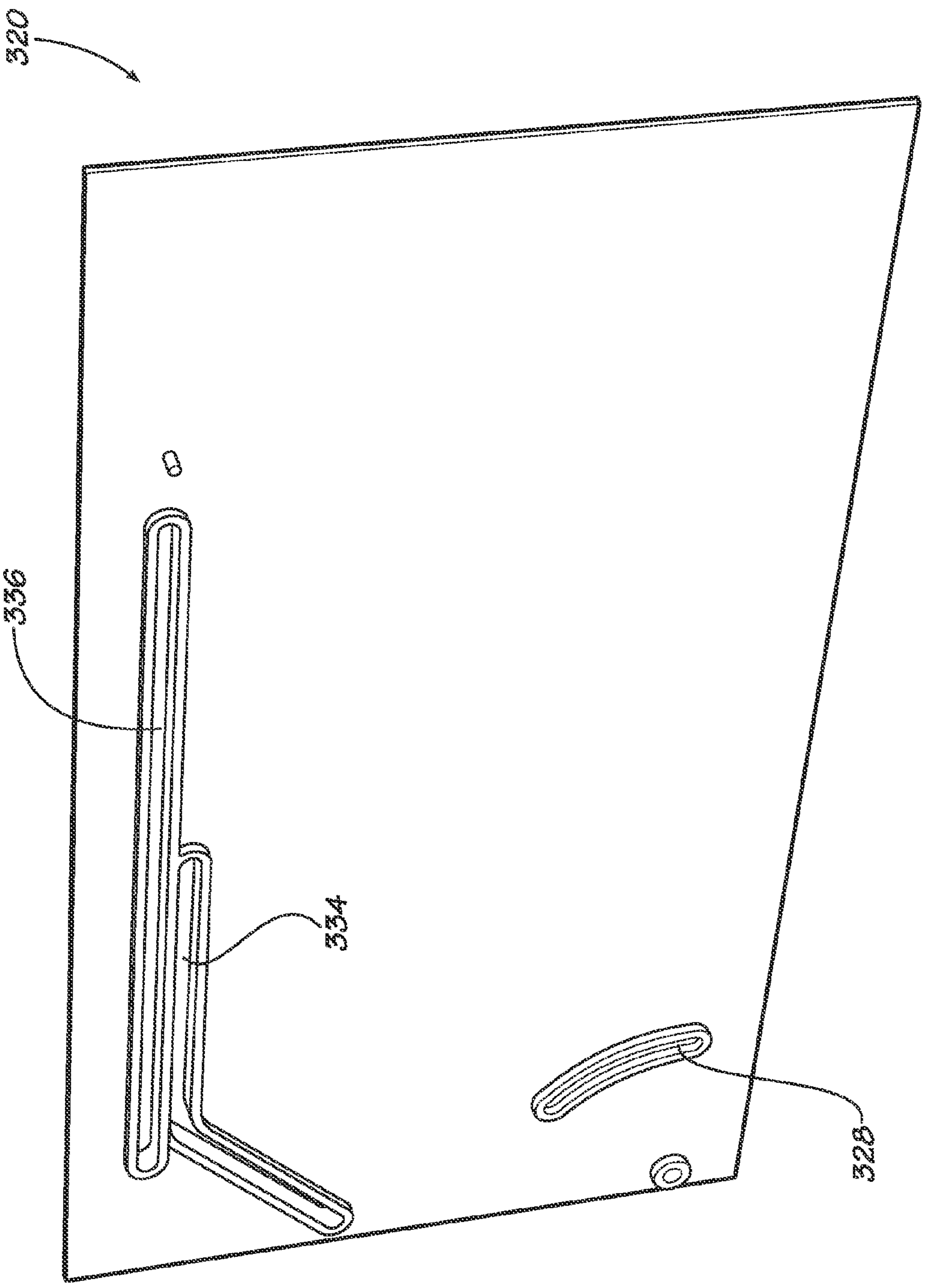
FIG. 33 is a perspective view of the divider of the controlled access device of FIG. 21.
Figure 35:
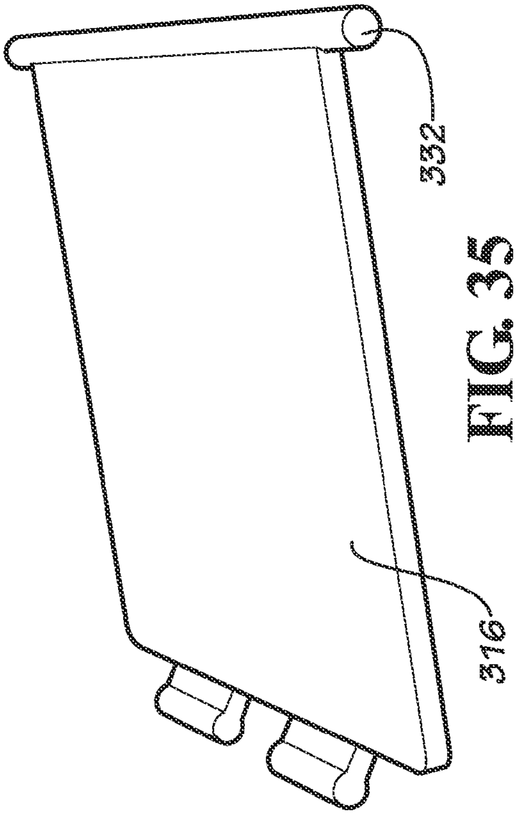
FIG. 35 is a perspective view of the second blocker of the controlled access device of FIG. 21.
Figure 34:
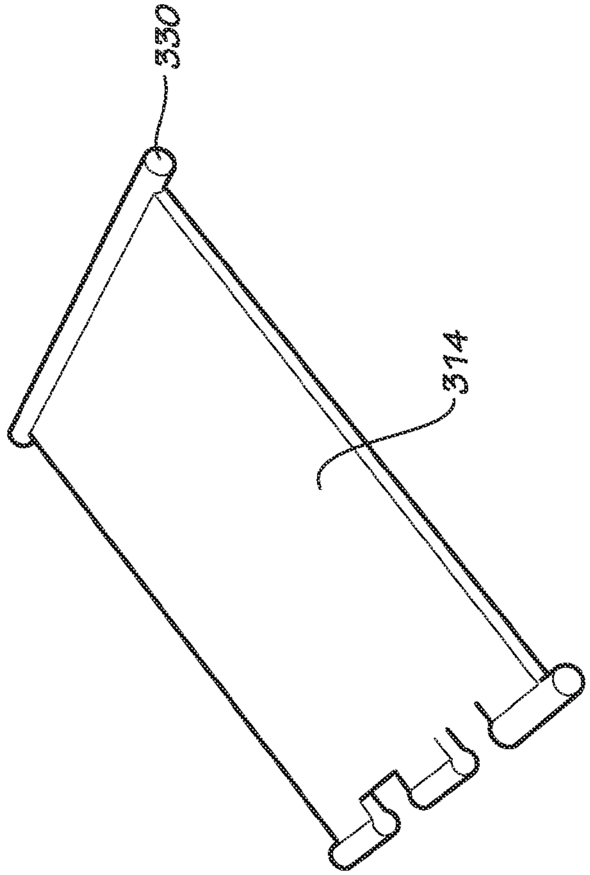
FIG. 34 is a perspective view of the first blocker of the controlled access device of FIG. 21.

In certain embodiments, door assembly 312 is a tip bin style door that pivots between an open and closed position around pivot 324. When door assembly 312 is closed, access to product located behind the door assembly is blocked to a consumer (FIGS. 23-27). As door assembly 312 pivots to its open position (FIGS. 28-31), a consumer has access to product housed within door assembly 312. As door assembly 312 pivots to its open position, protrusion 326 (FIG. 28) and protrusion 340 (FIG. 35) traverse generally upward along slot 328 in divider 320. Dividers 20 (FIG. 13) may be included on one or both sides of the devices to separate adjacent devices 300. Moreover, projection 330 of first blocker 314 (FIG. 34) traverses generally laterally and downwardly along slot 334 of divider 320 as door assembly 312 pivots to its open position (FIG. 28). At the same time, projection 332 of second blocker 316 (FIG. 35) traverses generally laterally along slot 336 of divider as door assembly 312 pivots to its open position (FIG. 28). After such movement, first and second blockers 314, 316 block access to the interior of device 300 when door assembly 312 is in the open position (FIG. 30). When door assembly 312 is released, spring 338 urges door assembly 312 back to its closed position. Door assembly 312 may also include a damper that prevents door assembly 312 from slamming shut.

Figure 26:
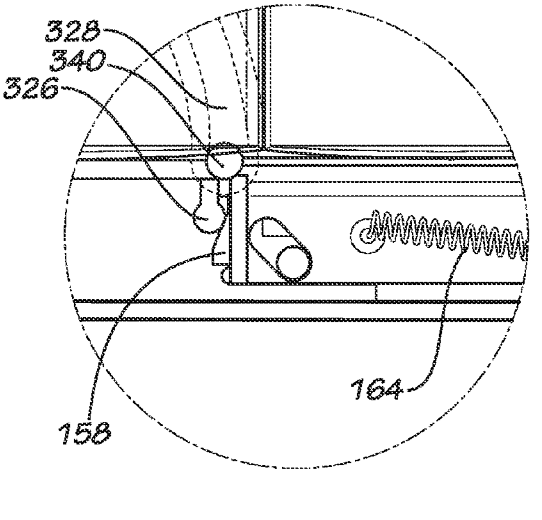
FIG. 26 is an enlarged view of the controlled access device of FIG. 25, taken at inset circle D.
Figure 27:
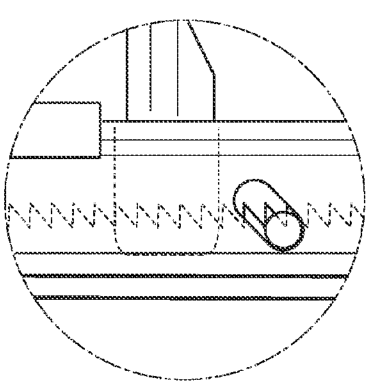
FIG. 27 is an enlarged view of the controlled access device of FIG. 25, taken at inset circle E.

As mentioned above, the door assembly 312 includes a projection 326 (shown in FIGS. 24 and 26). Projection 326 cooperates with stop 118 (described in detail above) so that when the door assembly 312 is closed, the projection 326 applies sufficient force to the front face 158 of the stop 118 to lower the stop 118 into its disengaged position to allow forward movement of the pusher 114 (described in paragraph 0041 above). When the door assembly 312 moves to its open position, as shown in FIG. 29, the projection 326 traverses generally upward along slot 328 so that the force is no longer applied to the front face 158 of the stop 118 and the stop 118 raises to its engaged position to prevent forward movement of the pusher 114 (as described in detail above). As the door assembly 312 is opened, spring 164 (FIG. 29) helps pull the stop 118 to its engaged position.

While the invention has been described in detail with particular reference to the disclosed embodiments, it will be understood that variations and modifications can be affected within the spirit and scope of the invention as described herein.

What is claimed is:

1. A system for controlling access to product housed within a device, the device comprising:

(a) an interior configured to receive a plurality of product;

(b) a door assembly comprising a top and a bottom and that revolves about its longitudinal axis between an open position and a closed position, wherein the door assembly comprises:

(i) a bottom plate having a circumference and having an engaging mechanism; and (ii) a cover that extends approximately halfway around the circumference of the bottom plate and that extends generally between the top and the bottom of the door assembly, the cover restricting access to the bottom plate when the door assembly is in the closed position and permitting access to the bottom plate when the door assembly is in the open position and the cover restricting access to the interior of the device when the door assembly is in either the open position or the closed position;

(c) a pushing assembly that comprises:

(i) a pusher comprising a brake, wherein the pusher is in sliding engagement with a track, wherein a front of the track is proximate the bottom plate of the door assembly and wherein the track comprises a resistance channel comprising gear teeth that project into the resistance channel and sides comprising a plurality of ramped slots, (ii) a spring that urges the pusher toward the front of the track and toward the bottom plate of the door assembly; and (iii) a stop positioned relative to the pusher and movable between a disengaged position and an engaged position, wherein the pusher is unable to move in a forward direction when the stop is in the engaged position, the stop comprising:

(1) a plurality of protrusions configured to cooperate with the plurality of ramped slots of at least one of the sides of the track and;

(2) a plurality of engagement surfaces configured to engage the brake of the pusher to prevent the pusher from moving forward when the stop is in the engaged position; and wherein the engaging mechanism of the door assembly is positioned with respect to the stop so that when the door assembly is in the open position, the stop is in the engaged position and when the door assembly is in the closed position, the stop is in the disengaged position.

2. The system of claim 1, wherein the bottom plate of the door assembly is circular.

3. The device of claim 1, wherein the cover extends along a periphery of the bottom plate from a first point on the periphery to a second point on the periphery, wherein the first and second points are located on opposing sides of the bottom plate.

4. The system of claim 1, wherein the cover is made of a transparent or semi-transparent material.

5. The device of claim 1, further comprising a resistance mechanism that slows the speed at which the spring urges the pusher forward.

* * * * *